United States Patent [19]

Hinman et al.

[11] Patent Number: 4,797,189
[45] Date of Patent: Jan. 10, 1989

[54] PRESSURE BALANCED SEALING PISTONS FOR CATHODES IN AN ELECTROLYTE CHAMBER

[75] Inventors: Edmund R. Hinman, Monroe; Richard A. Jack, Granby, both of Conn.

[73] Assignee: Airfoil Textron Inc., Lima, Ohio

[21] Appl. No.: 131,759

[22] Filed: Dec. 11, 1987

Related U.S. Application Data

[63] Continuation of Ser. No. 29,022, Mar. 23, 1987, abandoned.

[51] Int. Cl.$^4$ .......................... B23H 3/00; B23H 9/10
[52] U.S. Cl. .................. 204/224 M; 204/225; 204/129.7
[58] Field of Search ............... 204/224 M, 225, 129.7

[56] References Cited

U.S. PATENT DOCUMENTS

| | | | |
|---|---|---|---|
| 3,060,114 | 10/1962 | Sanders | 204/225 |
| 3,288,699 | 11/1966 | Trager | 204/224 |
| 3,309,294 | 3/1967 | Goodwin | 204/143 |
| 3,399,125 | 8/1968 | Mikoshiba et al. | 204/224 M X |
| 3,409,535 | 11/1968 | Ross et al. | 204/225 X |
| 3,466,235 | 9/1969 | Williams | 204/225 X |
| 3,515,659 | 6/1970 | Broat et al. | 204/224 |
| 3,523,876 | 8/1970 | Stark et al. | 204/129.1 |
| 3,536,599 | 10/1970 | Williams | 204/224 M X |
| 3,654,122 | 4/1972 | Williams | 204/129.7 X |
| 3,714,017 | 1/1973 | Stark et al. | 204/143 |
| 3,803,009 | 4/1974 | Kawafune | 204/129.1 |
| 3,970,538 | 7/1976 | Lucas | 204/224 |
| 4,052,284 | 10/1977 | Shrader | 204/224 |
| 4,057,475 | 11/1977 | Shrader | 204/129.1 |
| 4,167,462 | 9/1979 | Shrader et al. | 204/129.25 |
| 4,256,555 | 3/1981 | Wilson | 204/129.5 |
| 4,504,721 | 3/1985 | Inoue | 219/69 |

*Primary Examiner*—Donald R. Valentine
*Attorney, Agent, or Firm*—Edward J. Timmer

[57] ABSTRACT

An electrolyte chamber includes a cathode movable in the chamber toward a workpart to machine same and spaced from a wall of the chamber by a transverse clearance space and further includes a sealing piston movable transversely in the chamber in opposite directions toward and away from the cathode to substantially close off or open the clearance space. The sealing piston includes one or more fluid passages extending therethrough such that electrolyte pressure exerted on the sealing piston is substantially balanced in the opposite directions of movement such that unbalanced electrolyte pressure forces do not prevent the sealing piston from closing off the transverse clearance.

12 Claims, 23 Drawing Sheets

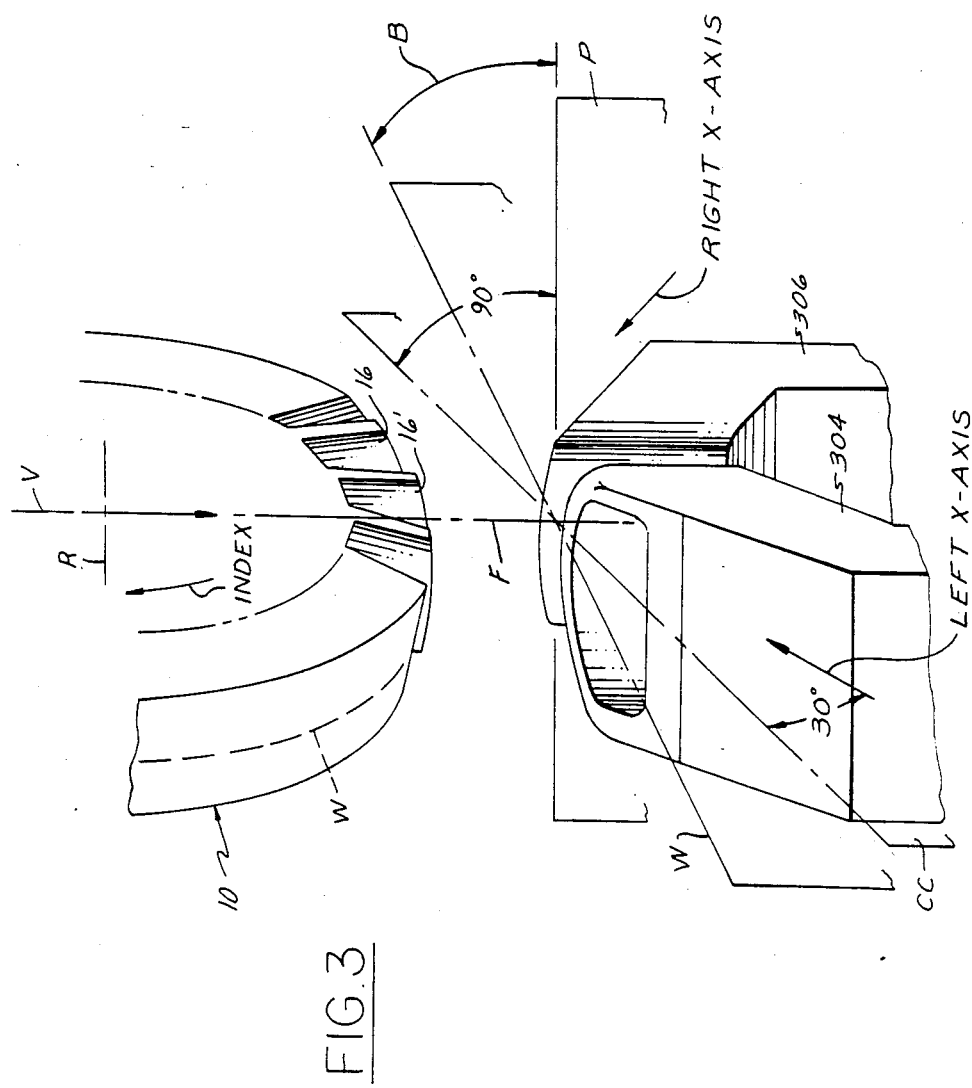

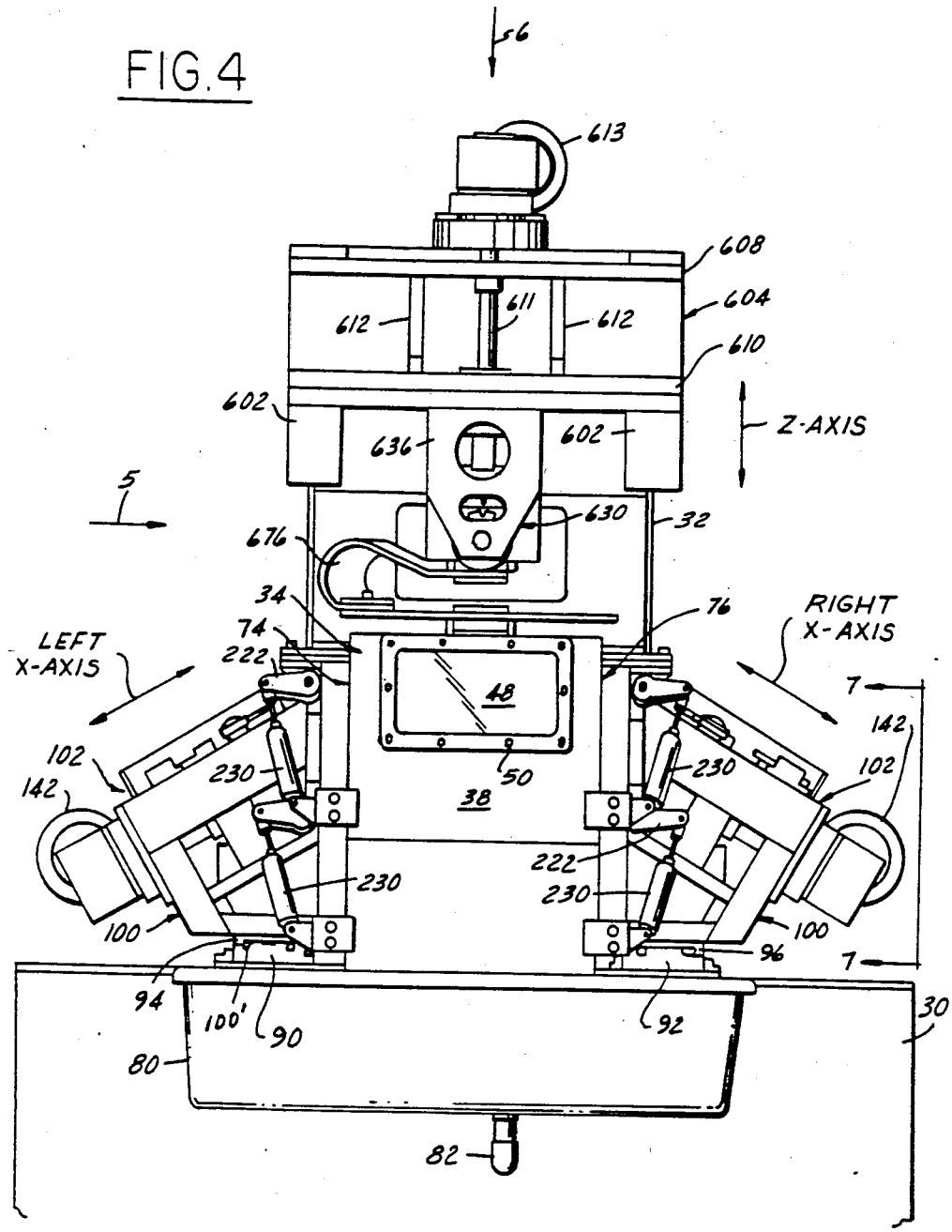

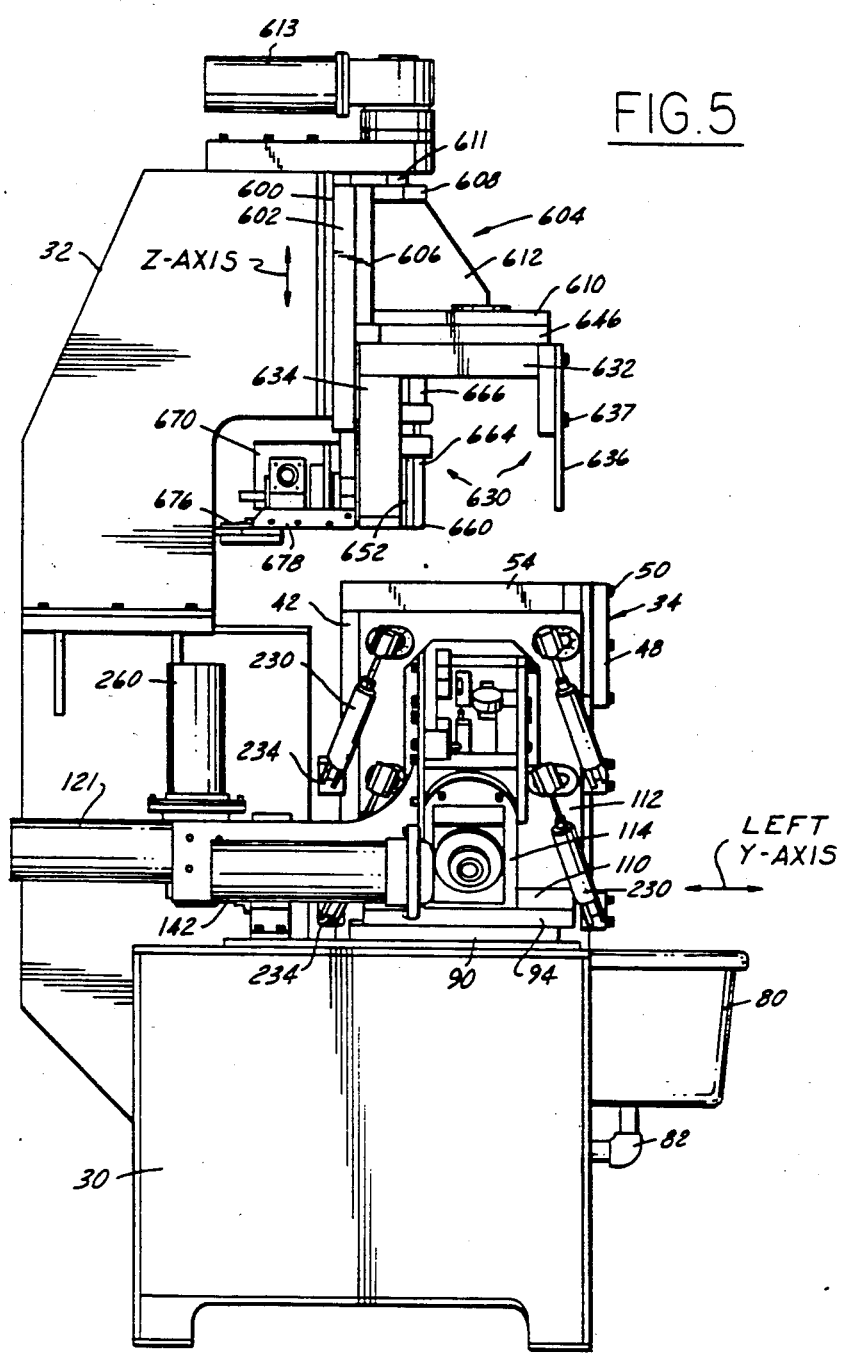

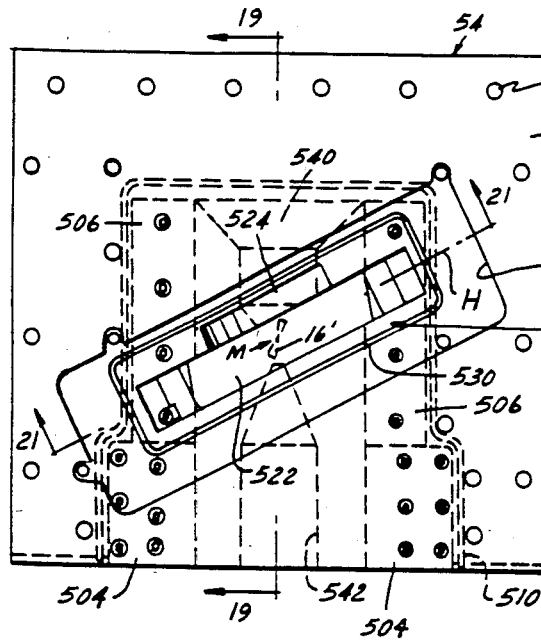
FIG. 18
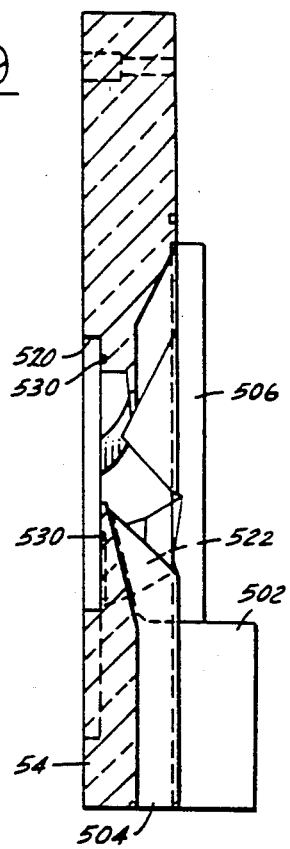
FIG. 19
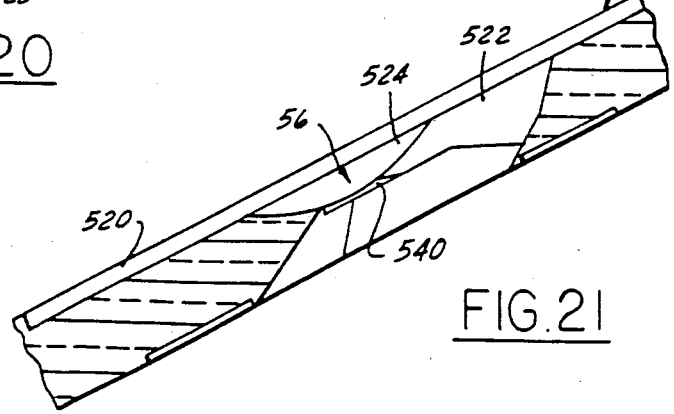
FIG. 20
FIG. 21

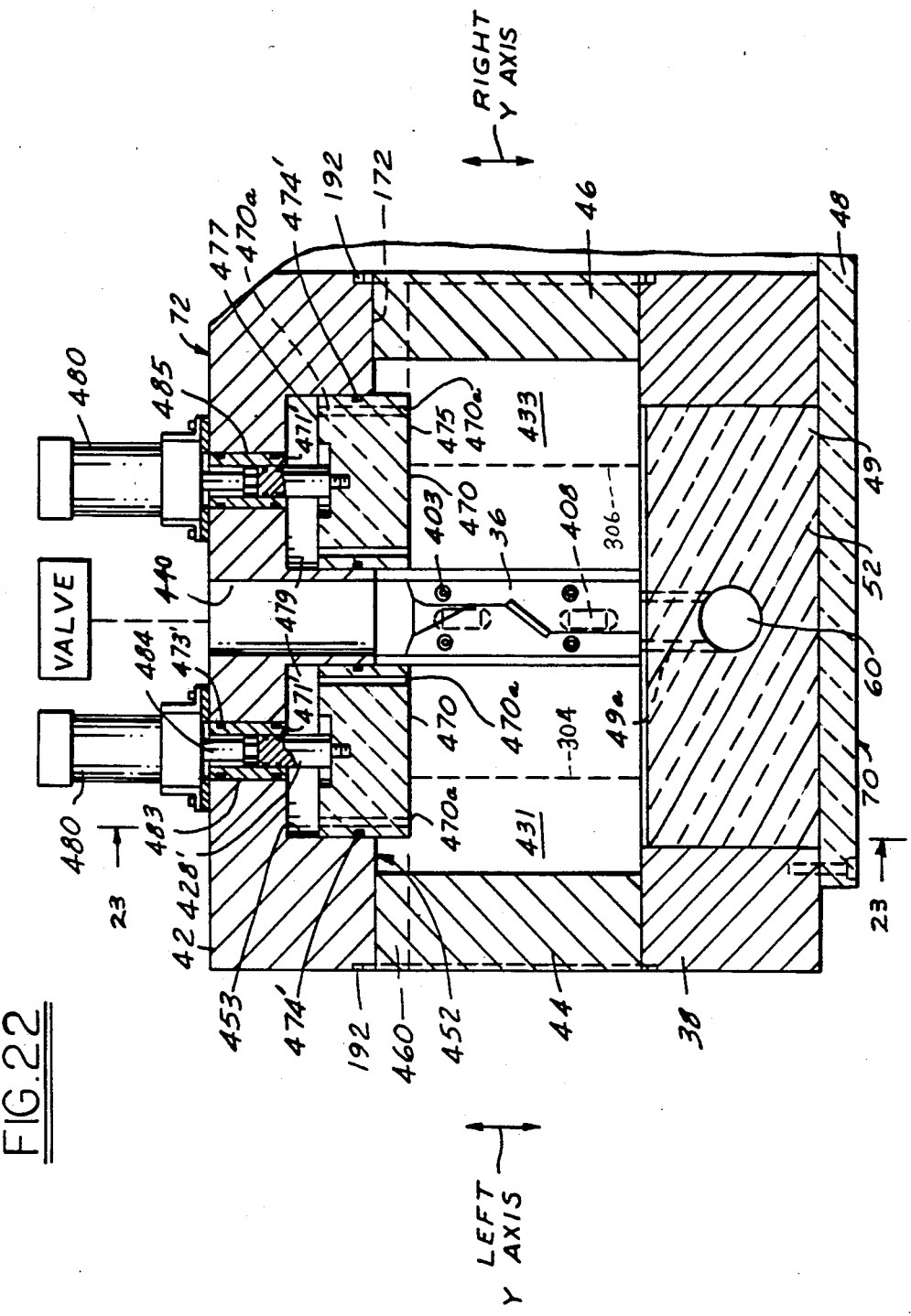

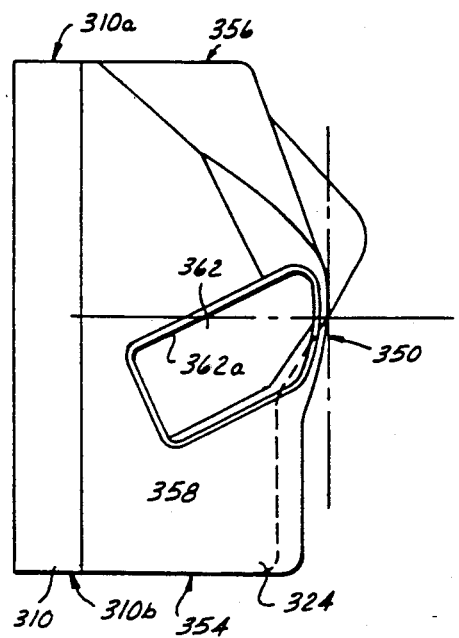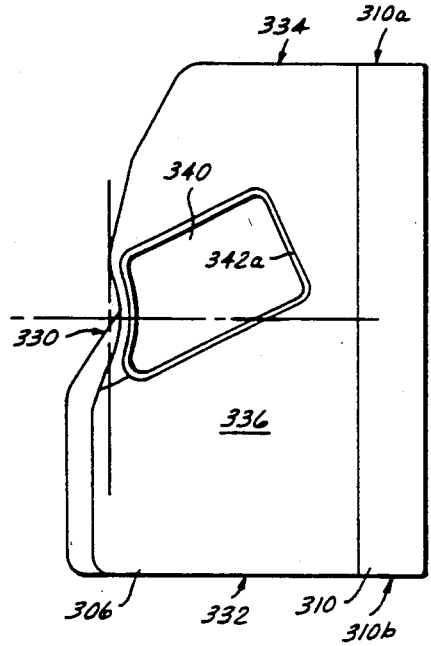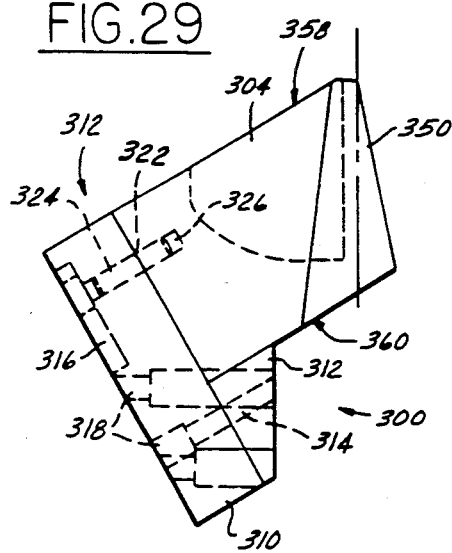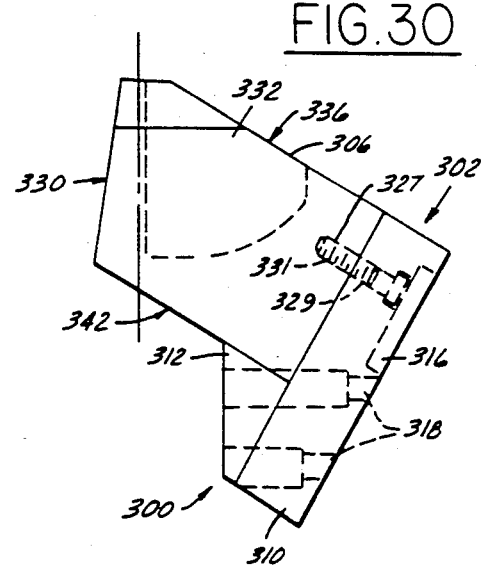

D.C. POWER SUPPLY

COORDINATED POSITION
(IBR OUT)

CATHODE START
MACHINING POSITION
(IBR IN)

CATHODE FINISH POSITION
(IBR IN)

FINISHED PART

PRESSURE BALANCED SEALING PISTONS FOR CATHODES IN AN ELECTROLYTE CHAMBER

This is a continuation, of application Ser. No. 029,022, filed on Mar., 23, 1987, now abandoned.

FIELD OF THE INVENTION

The invention relates to machines and methods for electrochemically machining a workpart and, in particular, for electrochemically machining a workpart having a central hub with rotational symmetry and radially projecting appendages, such as airfoils, spaced circumferentially around the hub periphery.

BACKGROUND OF THE INVENTION

Electrochemical machining (ECM) is a well known process for machining metallic based workparts and in the past has been employed to machine complex airfoil shapes on individual blades and complex airfoil blades attached to a central cylindrical hub and extending radially therefrom around its periphery.

ECM apparatus for machining individual airfoils projecting from the central hub of an integral bladed gas turbine engine rotor or wheel is shown in the Stark et al U.S. Pat. No. 3,523,876 issued Aug. 11, 1970; the Stark al U.S Pat. No. 3,714,017 issued Jan. 30, 1973; and the Kawafune et al U.S. Pat. No. 3,803,009 issued Apr. 9, 1974. In these patents, the airfoils are completely machined by the ECM process out of a cylindrical blank or disc of material.

Tne Trager U.S. Pat. No. 3,288,699 issued Nov. 29, 1966 illustrates an ECM apparatus for machining in simultaneous fashion multiple airfoils integral on a turbine wheel blank or disc wherein during axial advance of the cathode the workpart (turbine wheel blank) is rotated through a selected angle to impart a curve to the airfoils as they are formed by the cathode.

The Lucas U.S. Pat. No. 3,970,538 issued July 20, 1976 describes an ECM apparatus for mcchining oversize leading and trailing edges of airfoil blades integrally cast with a central hub to form an integral bladed rotor for a gas turbine engine. A special cathode structure is disclosed to ECM the leading and trailing edges.

Other prior art workers have employed ECM apparatus to machine a plurality of airfoil blades from one piece of elongated stock material or individual airfoils one at a time For Example, the Wilson et al U.S. Pat. No. 4,256,555 issued Mar. 17, 1981 illustrates ECM'ing an individual airfoil shaped blade preform using opposed cathodes which are caused to move toward opposite sides of the blade preform by movable arms or rams on a conventional machine. In the past, a ball screw assembly driven by a servomotor has been employed to drive each ram with the cathode thereon. In the patent, the cathode rams are driven in opposed directions at a 45° angle relative to the centerline of the blade. The Goodwin U.S. Pat. No. 3,309,294 issued Mar. 14, 1967 illustrates an ECM apparatus for shaping an individual metallic airfoil blade for an axial flow compressor of a gas turbine engine.

The Schrader U.S. Pat. No. 4,052,284 issued Oct. 4, 1977 illustrates an ECM apparatus for at least partially forming a plurality of airfoils in a workpart. The apparatus includes a plurality of separately movable electrodes, each pair of electrodes being movable along paths defining an acute angle relative to the sides of the workpart. The Schrader U.S. Pat. No. 4,057,475 issued Nov. 8, 1977 describes a ECM method for forming a plurality of airfoils in a single workpiece. The Schrader et al U.S. Pat. No. 4,167,462 issued Sept. 11, 1979 describes a control system for an ECM machine having a plurality of electrodes driven by a plurality of identical hydraulic pumps.

The Broat et al U.S. Pat. No. 3,515,659 issued June 2, 1970, discloses an electrochemical machine for machining an individual airfoil wherein fluid actuated members each carrying a sealing member are slid against opposite sides of a cathode toward and into sealing engagement with the opposite ends of the airfoil and, in combination with other components, seal off the cavity in which the airfoil is disposed to enhance electrolyte velocity. However, the fluid actuated sealing members slide in the same direction as that of relative movement between the cathode and airfoil being machined. The fluid actuated members are not balanced as far as electrolyte pressure is concerned.

The Sanders U.S. Pat. No. 3,060,114 issued Oct. 23, 1982 discloses an ECM machine and method using a reciprocating cathode structure. The Inoue U.S. Pat. No. 4,504,721 issued Mar. 12, 1985, illustrates a multiple axes electrical discharge machine for forming a three dimensional cavity in a workpart.

Copending patent application Ser. No. 021,699 filed Mar. 4, 1987, entitled "Electrolyte Chamber With Cathode Sealing Means For ECM Machining" in the name of Edmund R. Hinman as inventor discloses an electrolyte chamber having a pair of cathodes movable in the chamber toward a workpart so as to machine same and a respective sealing piston movable toward a respective cathode in a direction transverse to cathode movement toward the workpart so as to be placed in sealing relation to the respective cathode. The sealing pistons substantially close off a respective clearance space between each cathode and wall of the electrolyte chamber. However, there is no means disclosed for balancing electrolyte pressure on the sealing pistons.

SUMMARY OF THE INVENTION

The invention relates to an improved electrolyte chamber of the type having a cathode means movable in the chamber toward a workpart to machine same and having sealing means moveable in the chamber in opposite directions to effect substantial sealing or unsealing relation with the cathode means for substantially closing off a clearance space between the cathode means and wall of the chamber to substantially prevent high pressure electrolyte from bypassing around the cathode means. In particular, the invention contemplates an improved electrolyte chamber that includes means for substantially balancing electrolyte pressure exerted on the sealing means in the aforesaid opposite directions of its movement. Substantial balancing of electrolyte pressure on the sealing means in the directions of movement preferably prevents pressurized electrolyte from acting in an unbalanced manner thereon that might cause unwanted interruption in the closing off of the clearance space during electrochemical machining.

In a typical working embodiment of the invention, the sealing means includes a first side positionable adjacent the cathode in substantially sealed relation thereto and a second side operatively connected to means for moving the sealing means in the opposite directions with the sides being substantially equal in area. Conduit means, such as one or more passages, extend between the first and second sides for interconnecting them in fluid flow relation such that pressurized electrolyte present on one side will also be present on the other side to substantially balance electrolyte pressure on the sealing means.

Balancing of electrolyte pressure in this way allows the means for moving the sealing means to move and maintain the sealing means in position to substantially close off the clearance space and prevent electrolyte bypassing around the cathode means during machining.

In a preferred embodiment of the invention, the means for moving the sealing means comprises a reciprocal actuator means outside the chamber and having an actuator member extending through a wall of the chamber for operable connection to the sealing means. A high pressure electrolyte seal is disposed between the actuator member and chamber wall.

BRIEF DESCRIPTION OF THE DRAWINGS

FIG. 3 is a schematic perspective view showing the spatial relationship of the IBR and its center planes to the cathode center plane and machine center plane and the difficulty of access to the airfoil blade 16' to be machined.

FIG. 4 is a front elevation of the machine of the invention for electrochemically machining an IBR with integral preformed oversized airfoil blades to finish dimension.

FIG. 5 is a side elevation of the machine of FIG. 4 in the direction of arrow 5.

FIG. 18 is an elevation taken in the direction of arrows 18 in FIG. 17.

FIG. 19 is a sectional view taken along line 19 of FIG. 18.

FIG. 20 is a side elevation of FIG. 18.

FIG. 21 is a sectional view of FIG. 18 along line 21.

FIG. 22 is a sectional view taken along 22 of FIG. 17 showing the electrolyte pressure balancing passages in the sealing pistons.

FIG. 29 is a front elevation of the concave cathode assembly.

FIG. 30 is a front elevation of the convex cathode assembly.

FIG. 31 is a plan view of FIG. 29 of the concave cathode.

FIG. 32 is a plan view of FIG. 30 of the convex cathode.

DESCRIPTION OF BEST MODE OF CARRYING OUT THE INVENTION

Figure 1:
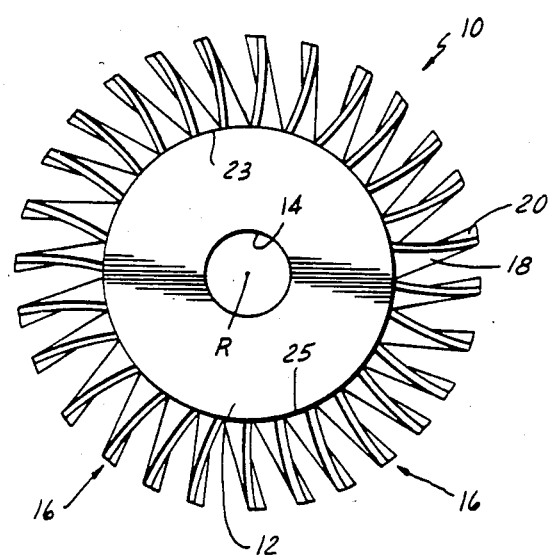
FIG. 1 is a perspective, schematic view of an integrally bladed rotor (IBR) for a gas turbine engine.
Figure 2:
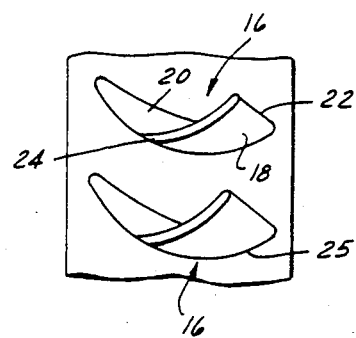
FIG. 2 is a plan view of a portion of FIG. 1.

Shown in FIGS. 1 and 2 is an integrally bladed rotor 10 (hereafter IBR) for a gas turbine engine. The IBR 10 includes a central cylindrical hub 12 with a throughhole 14 for receiving a shaft (not shown) by which the IBR is mounted in the compressor section of a gas turbine engine as is well known for rotation about its longitudinal axis R. Projecting radially from and spaced apart circumferentially around the hub is a plurality of twisted airfoil-shaped blades 16. Each blade 16 includes a first convex lateral side 18, a second oppositely facing concave lateral side 20 and leading and trailing edges 22, 24, respectively. Platform areas 23 extend from fillet radii 25 where each blade joins the hub 12.

The IBR shown may be formed in various known ways; e.g. it may be a machined structure, unitary cast structure, a composite structure where the blades 16 are preformed and the hub cast therearound to form an integral structure, a composite structure where the blades 16 are attached metallurgically to the hub, or a superplastically forged structure where the blades 16 are forged integrally with the hub from a common forging blank. Regardless of the technique employed to fabricate the IBR, the blades 16 will be preformed to an oversize shape or envelope E (FIGS. 44–45) requiring further machining to precise dimensional tolerances for use in a gas turbine engine.

The machine of the invention will be described hereinbelow with respect to the finish or semi-finish machining by the ECM process of the individual oversize blades or preforms 16 of the metallic IBR. The machine to be described finish machines the blades one at a time with the entire lateral sides 18,20 as well as leading and trailing edges 22,24, fillet radii 25 and platform areas 23 adjacent radii 25 being machined.

FIG. 3 illustrates somewhat schematically the spatial relationships involved between the IBR and machine features. For example, it can be seen that the IBR 10 is positioned with its lateral center plane W (plane through its thickness perpendicular to the center plane of the gas turbine engine in which it will operate and containing blade centerline F) at an angle B relative to the machine center plane P shown also in FIG. 3 as a vertical plane through the center of the machine. As will be explained below, the IBR 10 is fixtured to pivot about vertical axis V in its lateral center plane W so that the IBR center plane angle B relative to the machine center plane P can be varied within a selected range; e.g. 0°–45°, to place the centerline or stacking line F of airfoil blade 16' to be machined substantially within machine center plane P when the blade is at a workpart machining position M.

FIG. 3 also reveals that the cathode center plane CC is orthogonal to the machine center plane P when the blade is at the workpart machining position M and the cathodes are at the cathode or start machining position (also see FIG. 45) spaced on opposite sides of the blade. The cathode center plane CC is the plane therethrough that is orthogonal to the machine center plane P and that passes through the vertical centerline F of the airfoil blade at the workpart machining position M. The cathode feed axes or directions, right X-axis and left X-axis, are located at an inclined angle relative to horizontal; e.g. the X axes are oppositely inclined at a 30° angle relative to horizontal as shown.

Referring to FIGS. 4–6 and 22, a machine constructed in accordance with the invention is shown having a base 30 on which a generally C-shaped support 32 is fixedly mounted. Mounted on the top surface of base 30 is a structure 34 enclosing and forming therewithin an electrolyte chamber 36. The structure 34 includes a first rectangular front plate 38 with rectangular opening 40, a back plate 42 and first and second lateral side plates 44,46. A front cover plate 48 is releasably fastened to the front plate 38 by machine screws 50 to cover and close off opening 40 and carries electrolyte back-pressure member 49 with slots 49a communicating with chamber 36 and a drain opening 60 for electrolyte removal after it passes between the blade to be machined and cathodes. A bottom plate 52, FIG. 11, closes off the bottom of the electrolyte chamber 36 and a top plate 54, FIG. 18, to be described in detail hereinafter closes off the top thereof except for an opening 56 to receive a portion of the IBR as will be explained.

Bottom plate 52 includes a drain opening 60' to receive electrolyte from opening 60 after it passes over the airfoil blade being machined for recirculation to filtering equipment (not shown) for reuse in the ECM process.

As is apparent from FIG. 22, the electrolyte chamber forming structure 34 includes a front side 70 which is substantially parallel with back side 72 and first lateral side 74 which is substantially parallel with second lateral side 76.

A front basin 80 with its own drain fitting 82 is provided on the front of base 30 to catch electrolyte when front cover plate 48 is removed and to drain the electrolyte back to the filtering equipment.

As shown best in FIGS. 4–7 and 11, identical parallel first (left) and second (right) Y-axis slideways 90,92 and mating first (left) and second (right) Y-axis slides 94,96 are disposed adjacent first and second lateral sides 74,76, respectively, in substantially parallel relation thereto. The Y-axis slideways and associated slides are also parallel to machine center plane P. Positioned between the slideways 90,92 and their respective slides 94,96 are two rows of roller bearings 100' with the axes of the bearings inclined in opposite directions as shown to eliminate lateral play and movably mount each slide 94,96 on its respective slideway 90,92. The roller bearings 100' are mounted between a fixed longitudinal race 91 and longitudinal race 93 movable with slide 94 or 96 as the case may be.

Movement of slides 94,96 along the respective slideways 90,92 is in the so-called right Y-axis or direction or left Y-axis or direction. Identical ball screw mechanisms are employed to drive the slides 94,96 on the Y-axes or directions as will be explained.

Each Y-axis slide 94,96 carries a cathode support structure 100 and cathode mechanism 102 which are identical to the other although oriented in the opposite right and left axis directions on the respective slides 94,96 as shown in FIG. 4. As a rssult only the cathode support structure 100 and cathode mechanism 102 on the right slide 96 will be described, it being understood that the same cathode support structure and cathode mechanism is mounted on and movable with slide 94.

Figure 11:
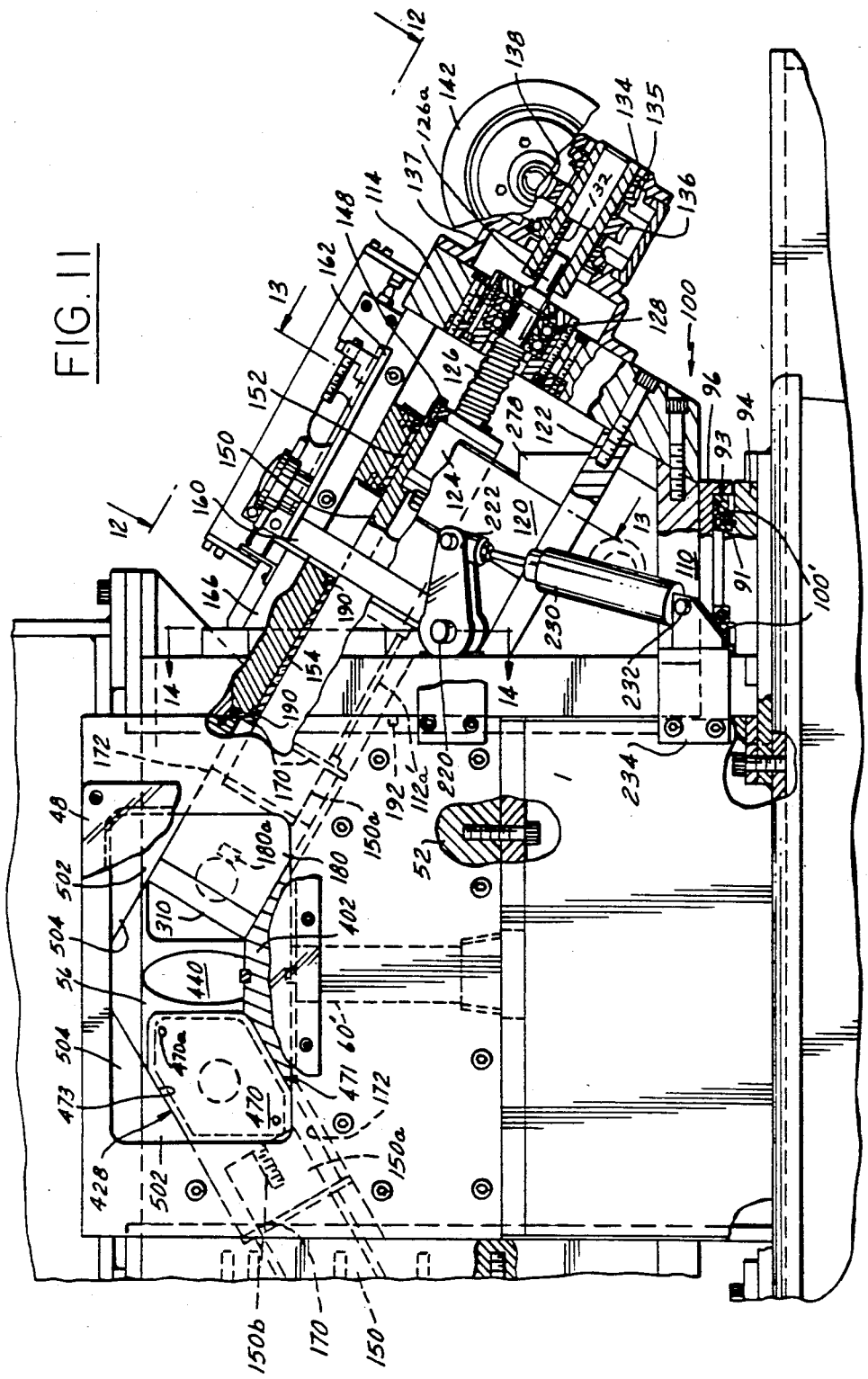
FIG. 11 is an enlarged front elevation of another portion of FIG. 3 with a portion in section.
Figure 12:
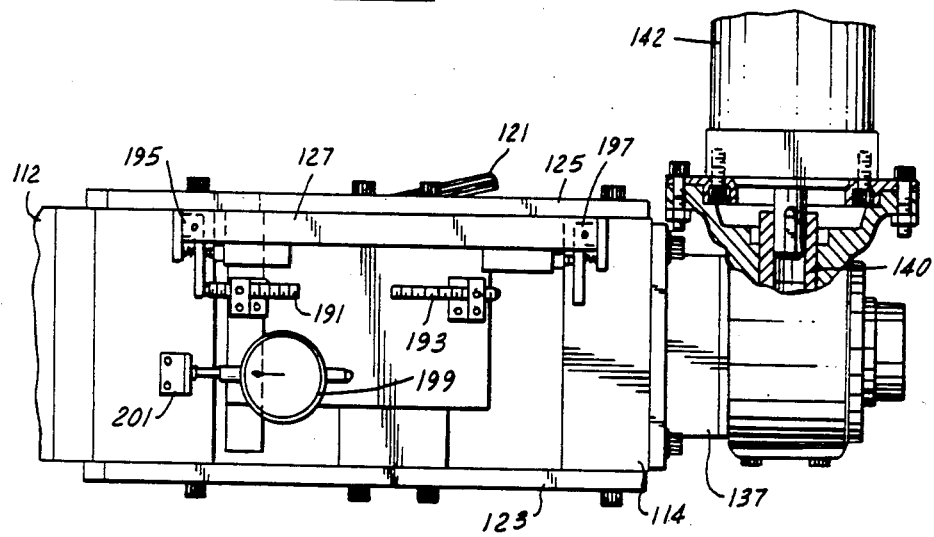
FIG. 12 is an elevation of a portion of FIG. 11 taken in the direction of arrows 12.
Figure 13:
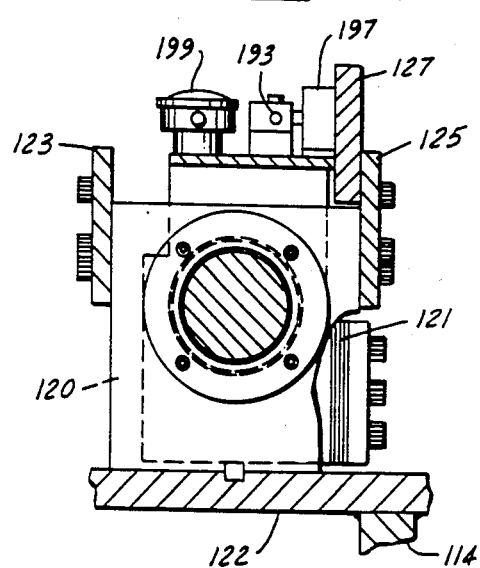
FIG. 13 is a sectional view taken along line 13 of FIG. 11.

Referring to FIGS. 11–13, the cathode support structure 100 is shown including a horizontal frame plate 110 affixed directly on slide 96, a vertical frame plate 112 affixed to horizontal frame plate 110 and an outwardly inclined frame plate 114 also affixed to horizontal frame plate 110.

A ball screw/nut housing 120 is mounted on cross frame members 122,123,125 attached between the vertical frame member and outwardly inclined frame member. Inside the housing 120 is a conventional ball nut 124 inside of which is received a ball screw 126 with recirculating balls (not shown) therebetween in known manner. Busses 121 extend from a conventional source of electrical power and are fastened to housings 120 to provide the proper polarity electrical potential between the cathode mechanisms 102 and IBR 10 which is made the anode for ECM'ing.

The ball screw 126 has an end 126a mounted in ball bearing assemblies 128 in the outwardly inclined frame member 114. End 126a is keyed by key 132 to a drive shaft 134 on which worm wheel 136 is mounted. Drive shaft 134 is rotatably mounted by bearing assemblies 135 in a housing 137 affixed to inclined frame member 114. Worm wheel 136 is driven in rotation by worm gear 138 on the output shaft 140 of D-C servomotor 142. Rotation of ball screw 126 of course causes ball nut 124 to translate in housing 120.

In particular, ball nut 124 is fastened by machine screws 148 (only one shown) to hollow cathode ram 150 which is supported for sliding movement in hollow bushings 152 and 154, which are coaxially aligned for translation of the ball nut along the right or left X-axis direction by the ball screw. As shown, the right cathode ram 150 and bushings 152,154 extend at an angle of inclination relative to vertical; e.g. 30°. Of course, the left cathode ram and associated bushings are inclined at an angle of inclination of 30° relative to vertical but in the opposite direction or sense. Of course, the right and left X-axes are orthogonal to machine center plane P when viewed in plan.

An indicator plate 160 is attached to cathode ram 150 for movement therewith and indicator plate 160 carries another indicator support plate 162 with it for purposes to be explained below.

Figure 14:
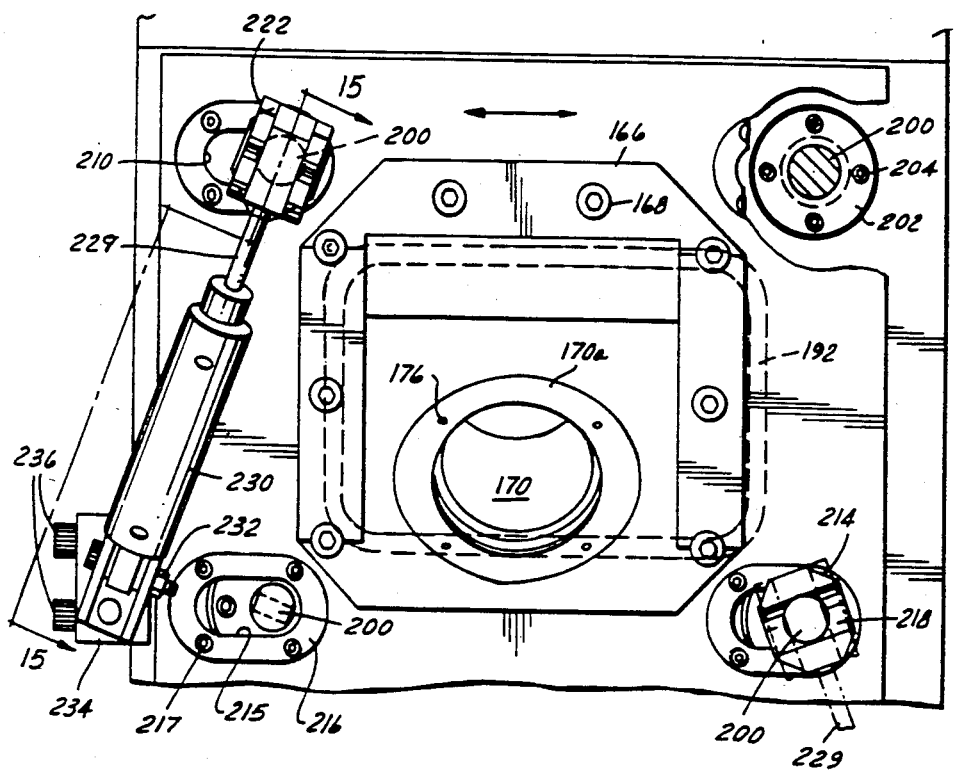
FIG. 14 is an enlarged side elevation of a portion of FIG. 11 in the direction of arrows 14 with the cathode support structure and certain clamp features removed.

As shown, hollow bushing 154 is mounted in a bushing support member 166 affixed by machine screws 168 to the vertical frame member 112, FIG. 14. The hollow bushing 154 terminates at its upper open end at an open-ended collar 170 received in a rectangular, flat-sided bore 172 in lateral side 76. Collar 170 has a complementary rectangular outer shape to fit in bore 172 and includes an annular flange 170a fastened by machine screws 176 to side plate 46. For reasons to be explained below, the inner diameter of the cylindrical inner bore of collar 170 is larger than the outer diameter of cylindrical cathode ram 150 which is thus received with clearance therein for movement along the right X-axis direction and importantly also in the right Y-axis direction orthogonal thereto. Of course, vertical frame member 112 also includes a bore 112a' to receive the hollow bushing 154.

The cylindrical ram 150 terminates at an end 150a which has fastened thereto via a machine screw (not shown) and threaded hole 150b a cathode support block 180 which is received with clearance for sliding movement in the right X-axis and Y-axis directions in the rectangular, flat sided bore or channel 172 in lateral side plate 46 as described in detail hereinafter. The cathode support block 180 has sides complementary in shape to those of channel 172 for such sliding movement.

As is apparent in FIG. 11, multiple o-ring seals 190 are employed to prevent entry of dirt and foreign matter into the hollow busings 152 and 154. And, as shown best in FIGS. 11, 14 and 22, a rectangular seal 192 is positioned between lateral side 74 and the vertical frame member 112. The purpose of this seal 192 well be explained below.

From the detailed description thus far, it is apparent that the right and left vertical frame members 112 are movable in the respective right and left Y-axis or direction relative to and substantially parallel to the lateral side 74 or 76 of the electrolyte chamber-forming structure 34.

As shown best in FIGS. 12-13, indicator support plate 162 movable with indicator plate 160 carries set screw 191 for controlling movement of the cathode ram 150 toward electrolyte chamber and set screw 193 for controlling movement of the ram away from the chamber. Set screws 191,193 engage limit switches 195,197, respectively, which switches control over-travel of respective ram drive motors 142. Of course, set screws 191,193 are adjustable by threading them relative to limit switches 195,197. Limit switches 195,197 are mounted on vertical cross frame member 127 which is attached to vertical cross frame member 125. A dial micrometer 199 is also carried on indicator support plate 162 to engage with stop 201 on bushing support member 166 to display the amount of travel of the cathode ram in the respective right and left X-axis direction.

Figure 15:
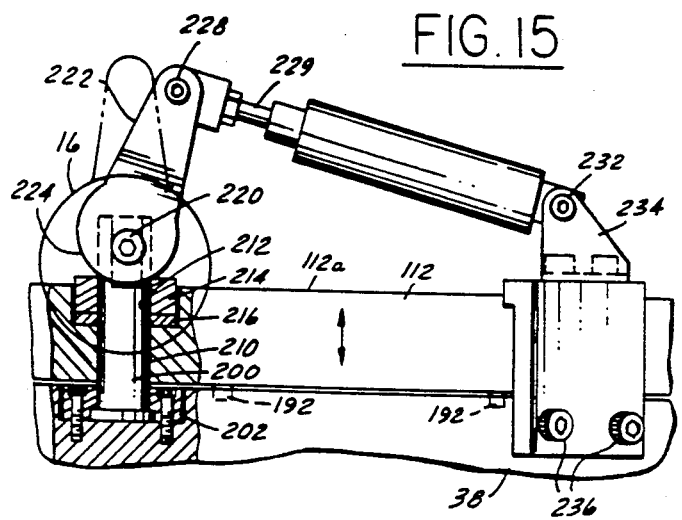
FIG. 15 is an elevation of FIG. 14 taken in the direction of arrows 15 with a portion in section.
Figure 16:
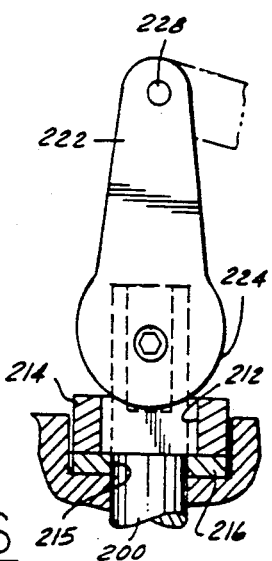
FIG. 16 is an enlarged view of portion 16 of FIG. 14.

During the ECM process there is a need to releasably retain or lock the position of the right and left vertical frame members 112 and thus of course slides 94,96 and cathode rams 150 in the right and left Y-axes or directions. To this end, releasable retaining means is provided in the form of four cylindrical studs 200 arranged in a square pattern on the lateral sides 74,76 of the electrolyte chamber-forming structure 34, in particular, at the corners of a square array as shown in FIGS. 4,5, and 14 for the right side 76. Each stud 200 is attached in fixed position to lateral side 76 by a lock collar 202 and associated machine screws 204. The studs are of a length sufficient to extend past the free surface 112a of the vertical frame member 112, as shown in FIGS. 14-16. In particular, each stud 200 extends through oval slots 210 in frame member 112 and through a cylindrical bore 212 of a washer 214 and through oval opening 215 in oval wear plate 216 positioned beneath the washer 214. Washer 214 includes a small radius curvilinear central shoulder 218 for purposes to be described. Of course, the wear plate 216 moves with the vertical frame member 212 in the Y-axis or direction relative to the associated studs 200 extending therethrough. Oval wear plate 216 is fastened to frame member 212 by machine screws 217.

Adjacent the free end of each stud 200 is a cross-pin 220 by which a clevis 222 is pivotally connected to each stud 200. As shown best in FIG. 15, the cross-pin 20 is eccentrically located relative to large radii cams 24 on the clevis. The cams 224 engage and contact the smaller radius central shoulder 218 of each associated washer 214. Each clevis 222 itself is pivotally connected by cross-pin 228 to the output shaft 229 of a pneumatic or other fluid cylinder 230. Each cylinder is in turn pivotally mounted by cross-pin 232 to a bracket 234 affixed to electrolyte chamber-forming structure 34. In particular, the upper and lower cylinders 230 nearest the front of the machine are pivotally connected to brackets 234 affixed to front plate 38 by machine screws 236.

Figure 7:
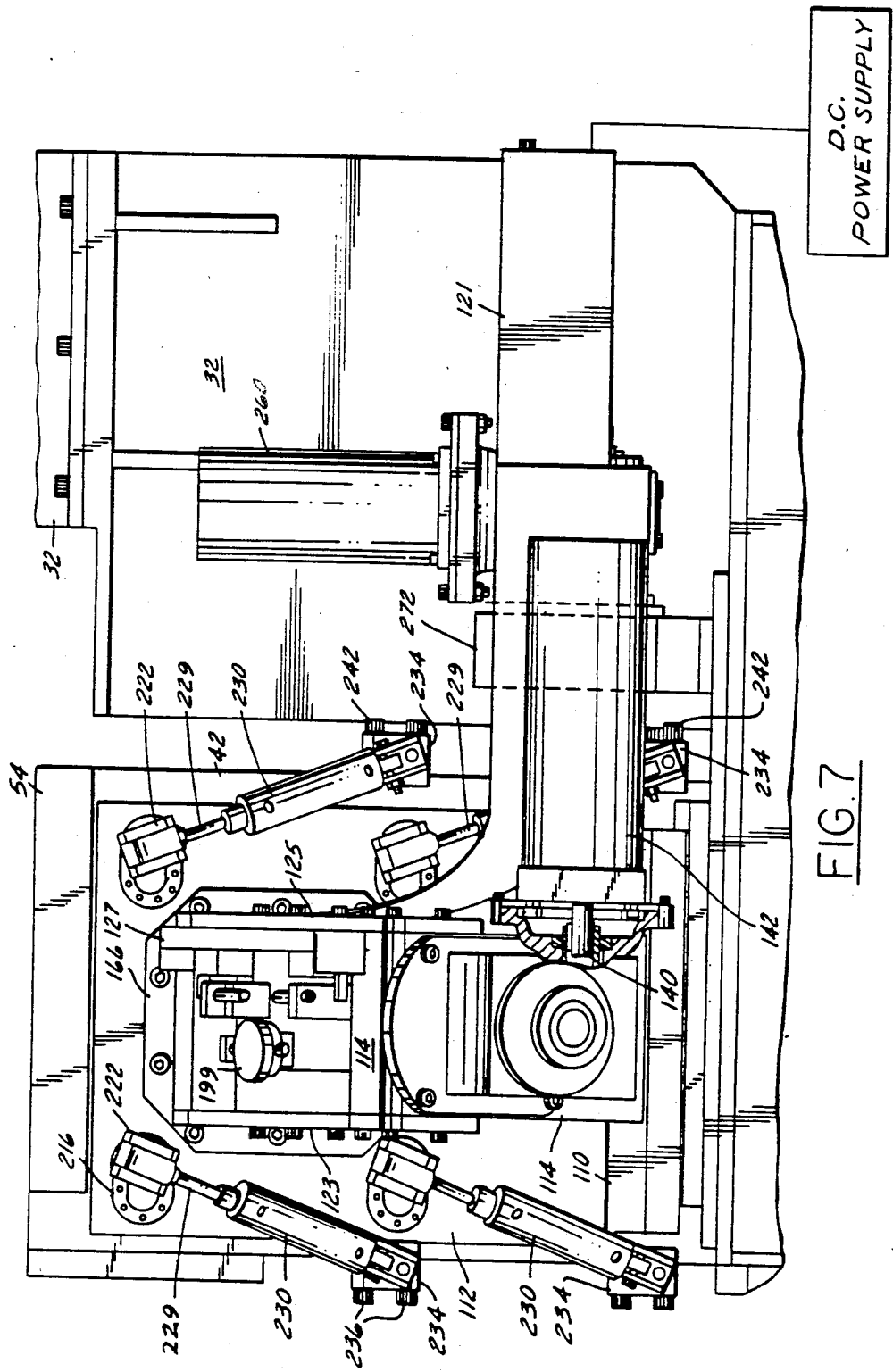
FIG. 7 is an enlarged side elevation of a portion of the machine in the direction of arrow 7.
Figure 8:
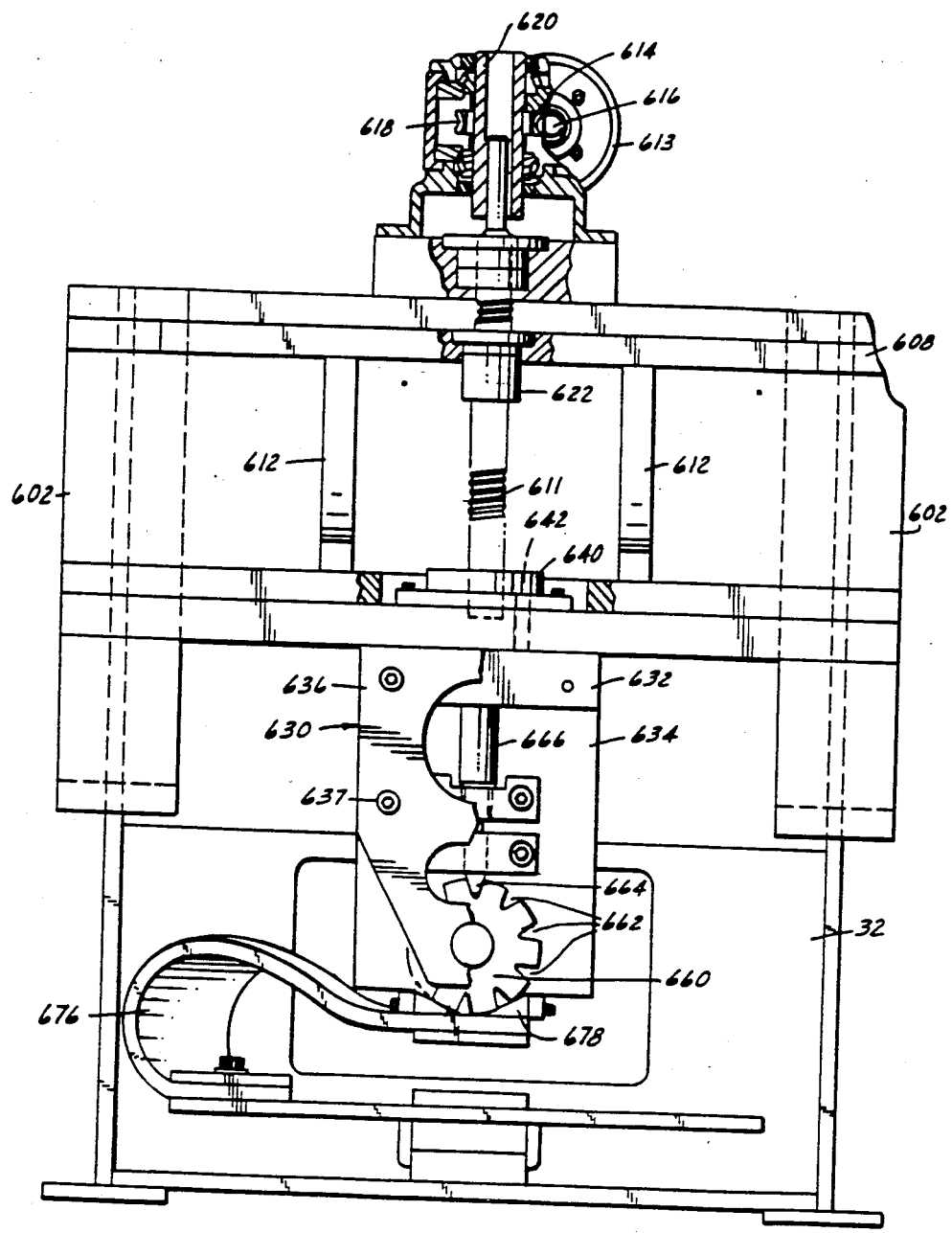
FIG. 8 is an enlarged front elevation of a portion of FIG. 4.

As seen best in FIGS. 4, 5 and 7, the upper and lower cylinders 230 nearest the back of the machine are pivotally connected to brackets 234 affixed to back or rear plate 42 of the structure 34 by machine screws 242.

When all the upper and lower cylinders 230 are actuated to retract their output shafts 229, each clevis 222 will be pivoted or rotated in FIGS. 13-15 to the clamp position shown in solid from the release position shown in phantom to cause the large radius cams 224 to eccentrically cam against smaller radius central shoulder 218 to force the vertical frame member 112 toward and against lateral sides 74,76 of structure 34 to releasably retain a selected position of the cathode support structure 100 along the right and left Y-axes or directions. Of course, retention or clamping of frame member 112 also clamps the associated slide 94,96 and cathode ram 150 in a selected right or left Y-axis position. When the right and left frame members 112 are thusly clamped, the rectangular seals 192 between lateral side 74,76 and the associated facing frame member 112 are compressed to effect positive sealing therebetween to prevent any potential electrolyte leakage therepast. Each seal 192, however, performs its sealing function even when the associated right or left vertical frame member 112 is moving along its Y-axis.

Figure 10:
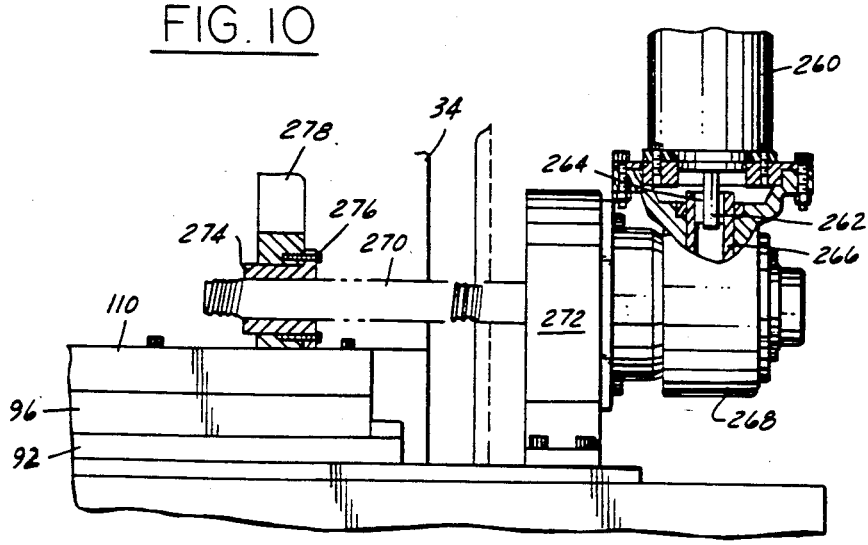
FIG. 10 is an enlarged view of FIG. 7 with components removed and others taken in section to show the X-axis slide drive.

The mechanisms for moving right and left Y-axis slides 94,96 are identical and that for moving slide 96 is shown in FIG. 10 as including an DC servomotor 260 with output shaft 262 keyed by key 264 to hollow shaft 266 of a conventional gear reducer 268. The gear reducer 268 in turn drives a conventional ball screw 270 mounted in housing 272 in the same manner as ball screw 126 is shown mounted in inclined frame member 114 in FIG. 11. The ball screw 270 cooperates with and drives in translation a ball nut 274 fastened by machine screws 276 to a vertical plate 278 attached on horizontal frame member 110. Thus, slide 96 and 94 are driven along the respective right and left Y-axis or direction by the respective DC servo drive motor and ball screw arrangement described.

As mentioned hereinabove, cylindrical hollow cathode ram 150 terminates at and is fastened to a cathode holder or support block 180 which is received for sliding bi-directional movement in the rectangular, flat-sided channel 172 in lateral side plate 46. Each cathode support block 180 has a cathode assembly 300 attached thereto as shown best in FIG. 17 so that each cathode mechanism or means 102 includes electrically conductive cathode assembly 300, cathode block 180, and cathode ram 150 receiving current through housings 120. Each assembly 300 (FIGS. 29 and 30) comprises a cathode holder 302 and either the concave cathode 304 or convex cathode 306 attached thereto as shown best in FIGS. 31 and 32. The cathode holders 302 for each cathode are identical in construction except that features are spatially in reverse. Each holder 302 includes a support plate 310 and filler plate 312 attached together by machine screws (not shown) in threaded bores 314 (only one shown). Each support plate includes a keyway or slot 316 facing the cathode support block 180 when assembled therewith and multiple threaded holes 318 to receive machine screws (not shown) by which the cathode holder is attached to the cathode support block 180. Threaded holes 180a, FIG. 11, in the cathode support block 180 receive these machine screws. The convex and concave cathodes 304 and 306 are similarly attached to the cathode support plate 310 by multiple dowels 322 received in holes 324,326 in the support plate and cathode and also by multiple machine screws 327 (only one shown) received in tapped holes 329,331 (only one of each shown) in the support plate and cathode in line with the dowel holes, FIG. 30.

Convex cathode 306 includes an inner concave working face 330 configured complementary to the convex lateral side 18 of the airfoil blade 16 to be machined and dimensioned so as to ECM the desired precise tolerances on that side 18 in the ECM process. Convex cathode 306 includes flat, substantially parallel sides 332,334 extending from the working face to and coextensive with the flat sides 310a,310b of the cathode holder 302. In the top surface 336 of the convex cathode is a recess or pocket 340 shaped and having a depth to receive an airfoil blade immediately adjacent the one 16' to be machined by the convex cathode as will be explained. The top surface 336 and bottom surface 342 of the convex cathode are flat and substantially parallel as shown best in FIGS. 30 and 32.

Concave cathode 304 includes an inner convex working face 350 configured complementary to the concave lateral side 20 of the airfoil blade 16 to be machined and dimensioned so as to ECM the desired precise tolerances on that side 18 in the ECM process. Concave cathode includes flat, substantially parallel sides 354,356 and flat, substantially parallel top and bottoms sides 358,360, FIGS. 29 and 31, with a recess or pocket 362 in the top side shaped and having a depth to receive an airfoil blade immediately adjacent the one being machined by the concave cathode as will be explained.

Cathode pockets 340,362 have an electrical insulating layer or coating 340a,362a over the entire pocket surface to prevent unwanted stray electrical current flow to blades 16 adjacent 16' during machining thereof as will be explained.

Figure 17:
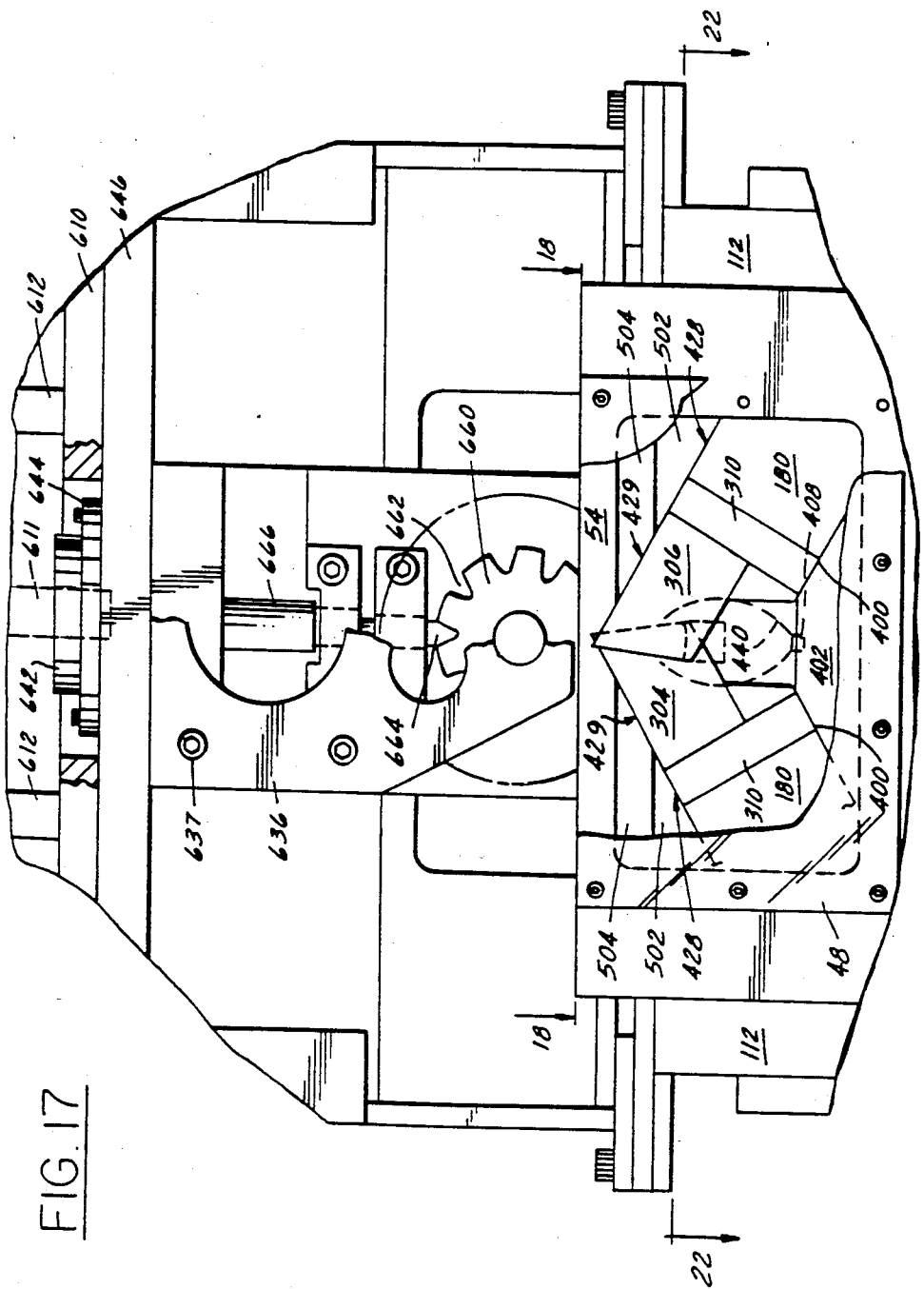
FIG. 17 is an enlarged elevation of a portion of FIG. 4 with portions of the electrolyte chamber and vertical slide yoke broken away.
Figure 34:
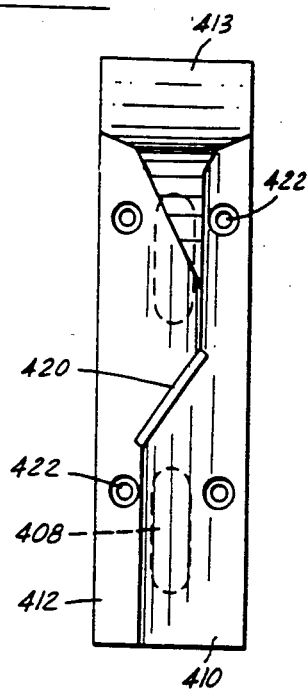
FIG. 34 is a plan view of FIG. 33.
Figure 36:
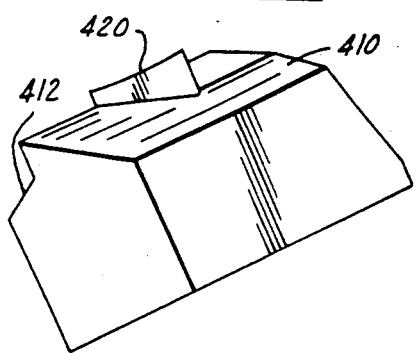
FIG. 36 is a projection of FIG. 35.
Figure 35:
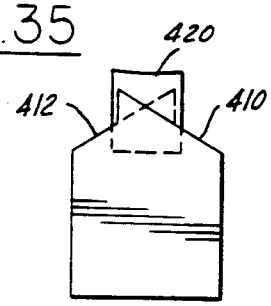
FIG. 35 is an end view of FIG. 34.

The electrolyte chamber 36 with the cathode assemblies 300 therein is shown best in FIGS. 17 and 22. It can be seen that the bottom flat sides of the cathode support blocks 180 and cathode holder 302 slide over oppositely inclined flat surfaces 400 of guide block 402. Mounted centrally on guide block 402 is a tip seal block 404 made of G10 glass/epoxy material. The tip seal block 404 is located on the guide block 402 by two coaxial keys 408, FIGS. 22 and 34, and extends upwardly toward the athodes 304,306 in the electrolyte chamber 36.

As shown best in FIGS. 33–36, the tip seal block 404 includes oppositely inclined flat guide surfaces 410,412 on which the flat bottom sides 342,360 of the cathodes are sealingly guided during cathode movement. The inclined guide surfaces 410,412 are inclined at the same angle, 30°, that the inclined flat surfaces 400 of guide block 402 are inclined. In the central portion of the tip seal block 404 is a tip seal member 420 configured and oriented to locate and sealingly contact the tip of the airfoil blade 16' which is to be machined between the cathodes 304,306. The tip seal member 420 is oriented at the desired angle of the blade tip to effect this locating and sealing contact action. The tip seal block 404 is mounted to the guide block 402 by multiple machine screws 403 in tapped holes 422 so that different tip seal blocks 404 can be used for IBR's with different airfoil blade designs.

As shown best in FIG. 17, the top surfaces of the cathode support block 180 and cathode holder 302 are guided during cathode movement by oppositely inclined guide surfaces 428,429 on a electrolyte chamber cover 54 which is shown in FIGS. 18–21 and is described hereinbelow.

Figure 23:
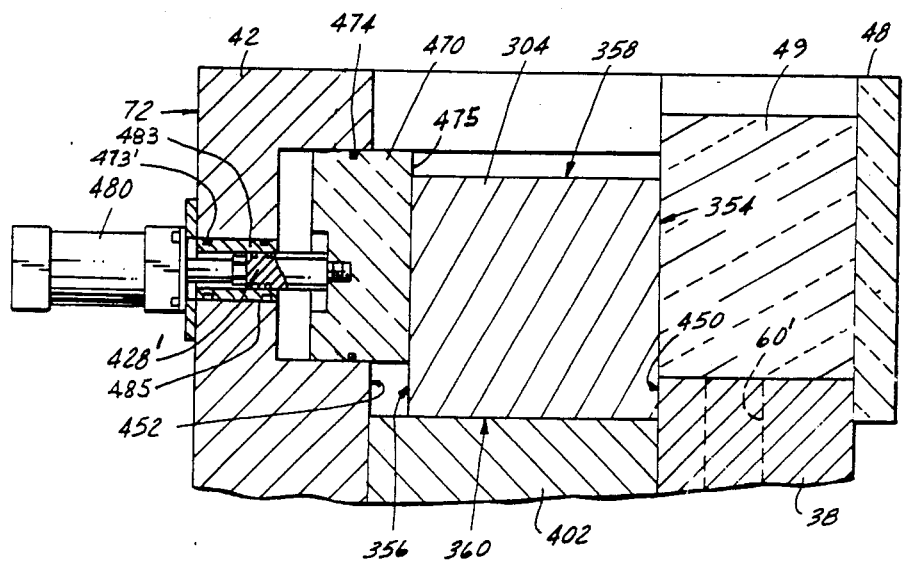
FIG. 23 is a sectional view taken along arrows of FIG. 22.

As shown best in FIGS. 22 and 23, transverse oppositely inclined channels 431,433 are formed in the structure 34 by channels 172 in side plates 44,46, by the guide block 402, by the guide surfaces 428,429 of the cover 54 and by the inner wall 450 of front plate 38 and inner wall 452 of back or rear plate 42. As is apparent, the cathode ram 150, cathode support block 180, cathode holder 302 and the respective cathode 304,306 attached thereto move in the opposing inclined channels 431,433. Of course, channels 431,433 incline toward one another at a 30° angle relative to horizontal.

Electrolyte flow is introduced between the cathodes 304,306 through electrolyte inlet opening 440 in the rear plate 42. As shown in FIGS. 17 and 22, the inlet opening 440 extends transverse to the direction of cathode movement in channels 431,433 and toward the working faces 330,350 of the cathodes 304,306. The electrolyte from inlet opening 440 flows between the cathode working faces 330,350 and lateral sides 18,20 of the airfoil blade being machined and into depending drain hole 60 in front plate 38 during movement of the cathodes from the start machining position to the finish position. Sliding close tolerance fit between guide block 402 and guide surfaces 428,429 and the cathode support block, cathode holder and cathodes prevent substantial electrolyte leakage therepast during the ECM process when the cathodes move from the start machining position to the finish positions as will be explained. Similarly, sliding close tolerance fit between inner wall 450 and the cathode support block and cathode holder prevent substantial electrolyte leakage therepast.

However, between the inner wall 452 of the rear plate 42 and rear surfaces of the cathode support block, cathode holder and cathodes is a clearance space 460 which is substantial (e.g. 1 inch) to provide for the Y-axes cathode movement. In order to seal off this space 460 and also to direct and form an electrolyte flow path toward the airfoil blade, first and second sealing pistons 470 are movably mounted on the rear plate 42 for movement transverse (orthogonal) to channels 431,433 from the rear wall 452 toward each cathode into substantially sealing relation with the flat rear sides of the cathode support block, cathode holder and cathodes to prevent substantial electrolyte leakage therepast during machining. The sealing pistons are identical except that certain features are spatially reversed as shown. As best seen in FIG. 11, a bottom inclined side 471 of each sealing piston slides or rides on block 402 whereas a top inclined side 473 rides on guide surfaces 428 during such transverse movement. The front surfaces 475 of the sealing pistons are flat, planar to be moved into sealed relation to the rear flat surface of each cathode 304,306 by virtue of being spaced closely thereto for relative sliding contact therewith; i.e. the cathodes, cathode support block and holder slide relative to front face 475 during machining. The sealing pistons 470 carry a single o-ring seals 474' and are actuated to slide in the transverse direction toward or away from the respective cathodes by first and second hydraulic or fluid cylinders 480 mounted on the outside of the rear plate 42. The piston rods 484 of the cylinder are connected to shafts 428' attached to the sealing pistons.

Since the electrolyte used in machining is at relatively high pressure, e.g. 150 psi, electrolyte can penetrate between front surfaces 475 of the sealing pistons and rear flat surface of each cathode that are in sliding contact or fit.

It has been found that the electrolyte pressure between sealing surface 475 and the rear cathode surface can be sufficiently high to overcome the force of actuating cylinders 480 and as a result force sealing pistons 470 away from the rear cathode surfaces to substantially open the respective clearance space 460 and allow excessive electrolyte bypassing that may disrupt the electrochemical machining process.

To avoid this occurrence, the present invention provides means for substantially balancing electrolyte pressure in the transverse directions of movement of each piston (i.e. toward or away from the respective cathode 304,306) in the form of conduit means or passages 470a extending between front surface 475 and rear surface 477 of each sealing piston to fluidly interconnect them such that electrolyte pressure on one side will be substantially equal to electrolyte pressure on the opposite side since the first side and second side are made substantially equal in area. Of course, the conduit means (passages 470a) could constitute grooves on the exterior of each sealing piston extending from the first side 475 to second side 477 or possibly grooves in wall 452 fluidly interconnecting electrolyte chamber 36 and counterbores 479 defined by wall 453 in which the rear side 477 is disposed. In any case, during machining with high pressure electrolyte flow from inlet 440 to chamber 36, counterbores 479 will fill with high pressure electrolyte to balance electrolyte pressure between the front sealing surface 475 and respective rear cathode surface and prevent an electrolyte pressure imbalance on sealing pistons 470 that might be sufficient to cause cylinders 480 to be overcome.

Since high pressure electrolyte resides in counterbores 479 during machining, o-ring seals 471' are provided between the shafts 428' and a sleeve or bushing 483 in bore 485 in plate 42 through which the piston rods 484 reciprocate or slide as shown. Also, o-ring seals 473' are provided between bushing 483 and plate 42 as shown to this same end.

0-ring seal 474' is provided around the perimeter of each piston 470 or otherwise between each piston and wall 453 to allow and accommodate dimensional changes in that direction of each piston 470; e.g. swelling from water absorption from the electrolyte by the material from which the sealing pistons 470 are made; e.g. Nylotron GS plastic, in the event such a material is used.

As stated above and hereafter, the cathodes 304,306 and cathode holders are positioned in the fully forward right and left Y-axis positions as shown in FIG. 22 against inner wall 450 of front plate 38 at the inception of ECM machining (at the cathode start machining position, FIG. 45) by advancing the cathodes along their respective slides 94,96. It can be seen that the sealing pistons close off the channels 431,433 between the inner wall 452 of back plate 42 and the rear sides of the cathodes and cathode holders. The sealing pistons are moved into such sealing engagement shown when the cathodes are placed in the machining position from the coordinated position as described below prior to advancement of the cathodes toward one another and the blade 16' along the respective right and left X-axes and turn on of electrolyte flow from inlet 440.

· Electrolyte is supplied to inlet opening 440 under high pressure by a conventional pump (not shown) and electrolyte tank (not shown).

Referring to FIGS. 18–21, the cover 54 for the electrolyte chamber-forming structure 34 is shown including a top plate 500 and inserts 502,504 and 506 fastened thereto by machine screws as shown with a sealing member 510 extending therebetween as shown. Top plate 500 and inserts 502,504,506 are made of G10 glass-/epoxy material.

It is apparent that aforementioned guide surface 428,429 are provided on inserts 502,506,504, respectively. It is also apparent that top plate 500 includes a generally rectangular recess 520 when view in plan and that smaller recesses 522 and 524 constituting opening 56 are disposed in the bottom of recess 520 through top plate 500 and inserts 502,504,506. Recesses 522 and 524 are generally rectangular in plan and generally semi-circular in elevation as shown. Disposed in the bottom of recess 520 outwardly of and around recesses 522,524 is a seal 530 for purposes to be explained.

Figure 37:
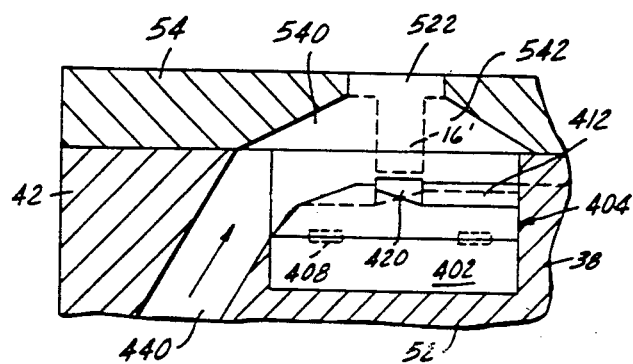
FIG. 37 is a partial sectional view of structure taken along lines 37 of FIG. 22.
Figure 38:
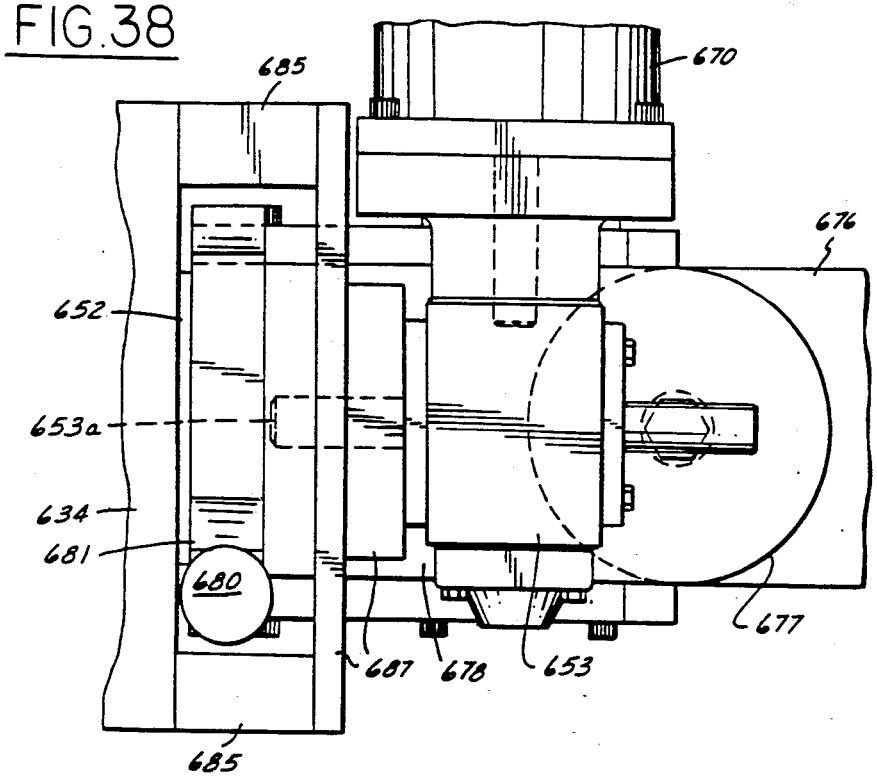
FIG. 38 is a plan view of the electrical continuity clamp mechanism for engaging the indexer shaft 652.
Figure 39:
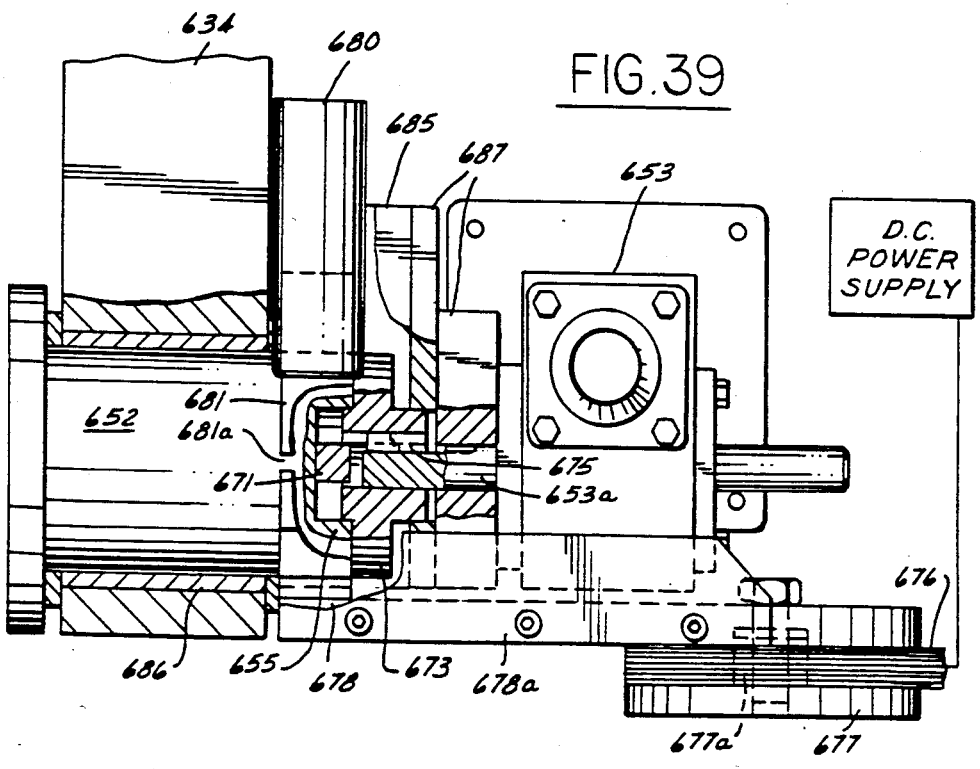
FIG. 39 is an elevation of FIG. 38.
Figure 40:
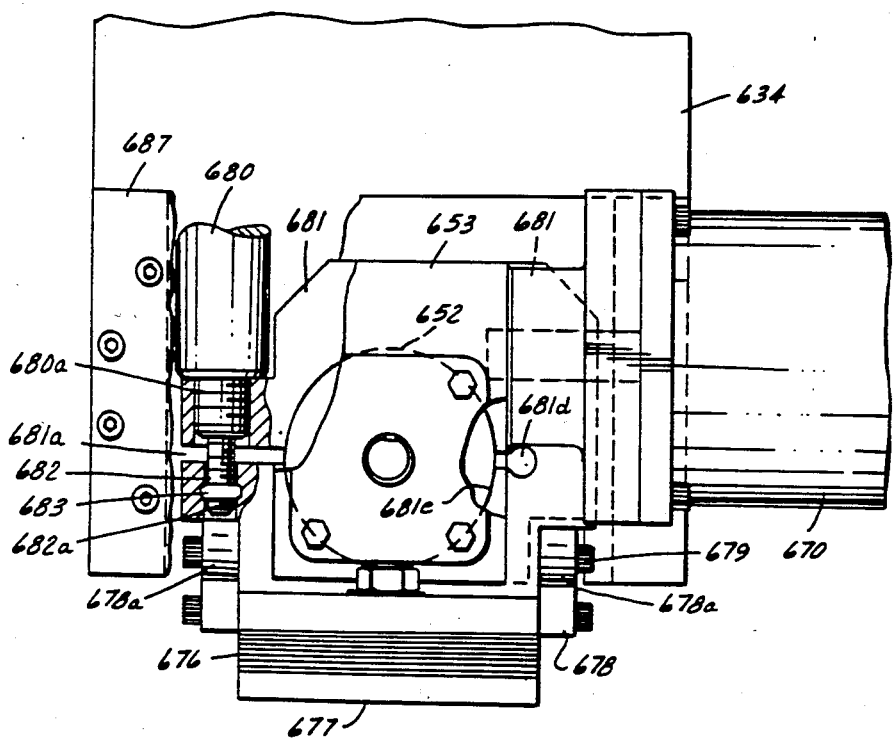
FIG. 40 is an end view partially broken away of FIG. 38.

The cover 54 is fastened to the top of the structure 34 by multiple machine screws 532. When so fastened, recess 524 is adapted to receive a portion of the hub 12 of the IBR 10 whereas recess 522 is adapted to receive the several airfoil blades 16 projecting radially from the hub. As is apparent, recess 522 opens at the bottom to the electrolyte chamber 36 so that those blades project into the chamber. Recess 522 is intricately configured as shown to accommodate the twisted airfoil blades of the IBR and its configuration may vary depending upon the IBR and IBR blades being machined. Inserts 502,504,506 are replaceable with others of different shape to accommodate other IBR's. From FIGS. 18 and 37, it is apparent that inserts 506 and cover plate 500 are shaped to provide an electrolyte flow channel 540 which narrows as it approaches blade 16' to be machined. Likewise, inserts 502,504,506 and cover plate 500 form an electrolyte discharge channel 542 which widens to convey electrolyte to drain 60.

A chamber 550 is thus provided by the top plate 500 and inserts 502,504,506 into which the cathodes 304,306 can be moved on opposite sides 18,20 of the blade 16 being machined. The end stroke finish position (see FIG. 46) of the cathodes 304,306 in this chamber is illustrated in FIG. 17.

Figure 6:
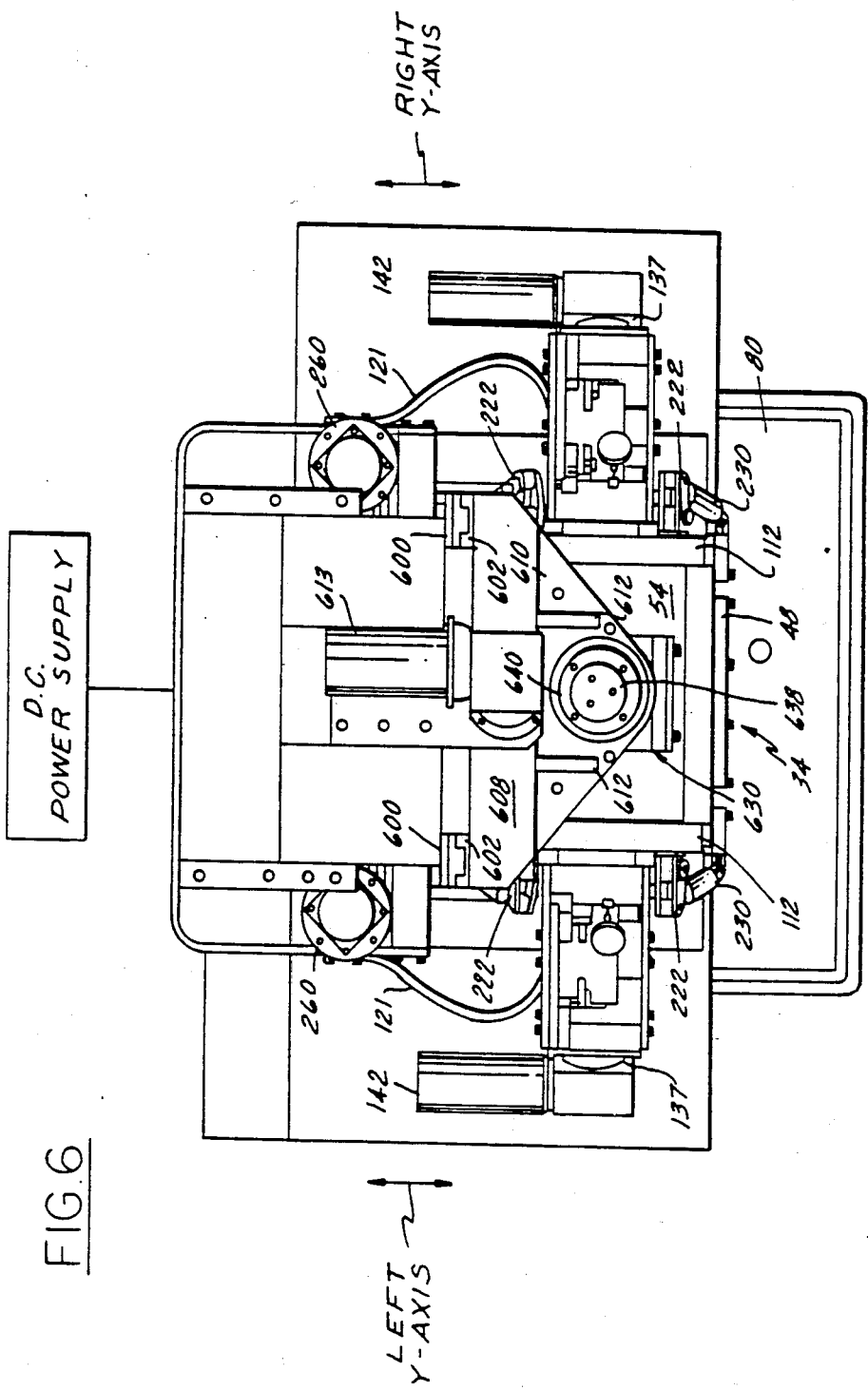
FIG. 6 is a plan view of the machine of FIG. 4 in the direction of arrow 6.
Figure 9:
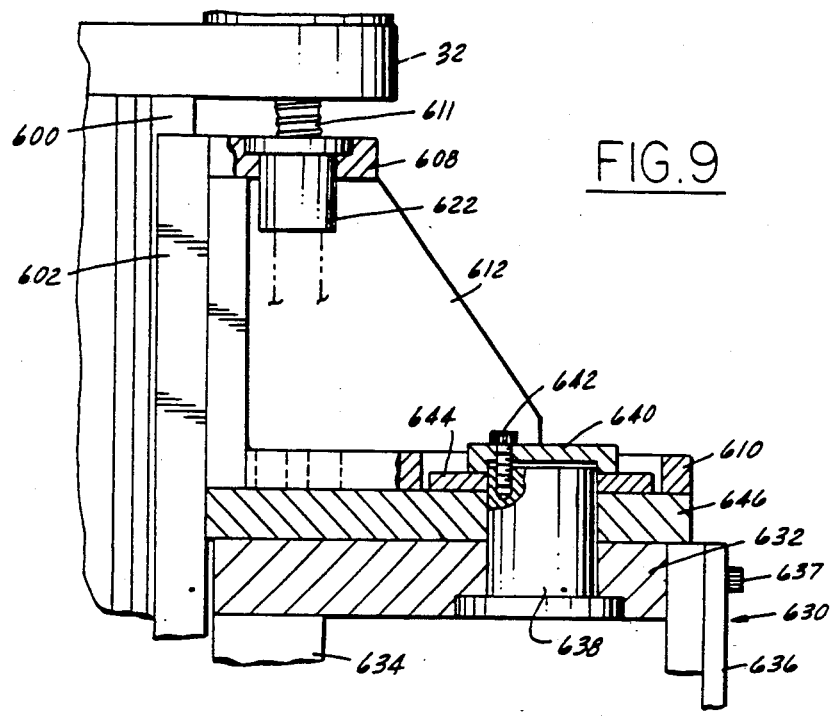
FIG. 9 is a side elevation of a portion of FIG. 8 with a portion in section.

As shown in FIGS. 5, 6 and 9, the C-shaped frame 32 includes a pair of parallel vertical slideways 600 on which a pair of parallel vertical slides 602 are slidably mounted. Vertical slides 602 are affixed to a support structure 604 comprising vertical rear support member 606, upper horizontal support member 608 and lower horizontal support member 610. A pair of vertical stiffener member 612 extend toward the front of the machine between horizontal members 608,610. As a result of being mounted to slides 602, the support structure 604 is movable in the vertical or Z-axis or direction. The Z-axis slides and support structure are moved vertically by means of a ball screw 611 driven by a DC servomotor 613. In particular, a worm gear 614 on the motor output shaft 616 drives a worm wheel 618 on a drive shaft 620 keyed to the upper end of the ball screw 611. A ball nut 622 is affixed on horizontal support member 608 to complete the drive mechanism for the Z-axis slide.

The support structure 604 pivotally carries a yoke assembly 630 on which the IBR is carried. In particular, yoke assembly 630 includes a horizontal yoke member 632, a rear vertical yoke member 634 and a front vertical yoke member 636. As shown best in FIG. 9, the horizontal yoke member 632 is pivotally supported relative to lower horizontal support member 610 by a flanged cylindrical pivot pin 638 extending therethrough as shown. Pivot pin 638 is clamped against angular movement by clamp collar 640 and machine screws 642 engaging ring member 644 around the upper end of the pivot pin. The yoke assembly 630 can be angularly adjusted for reasons to be explained by loosening machine screws 642, rotating the yoke assembly 300, pivot pin 638 and collar 640 the desired degrees and then tightening the machine screws 642 to releasably lock the adjusted position of the yoke assembly.

Positioned between the horizontal yoke member 632 and lower support member 610 and fastened to the latter is an insulator plate 646 of electrical insulating material such as well known G-10 glass/epoxy composite material to prevent electrical current flow to the support structure 604.

The centerline or pivot axis of the pivot pin 638 is coaxial with the line of intersection of the machine center plane P and cathode center plane CC as well as centerline of blade 16' being machined.

Figure 26:
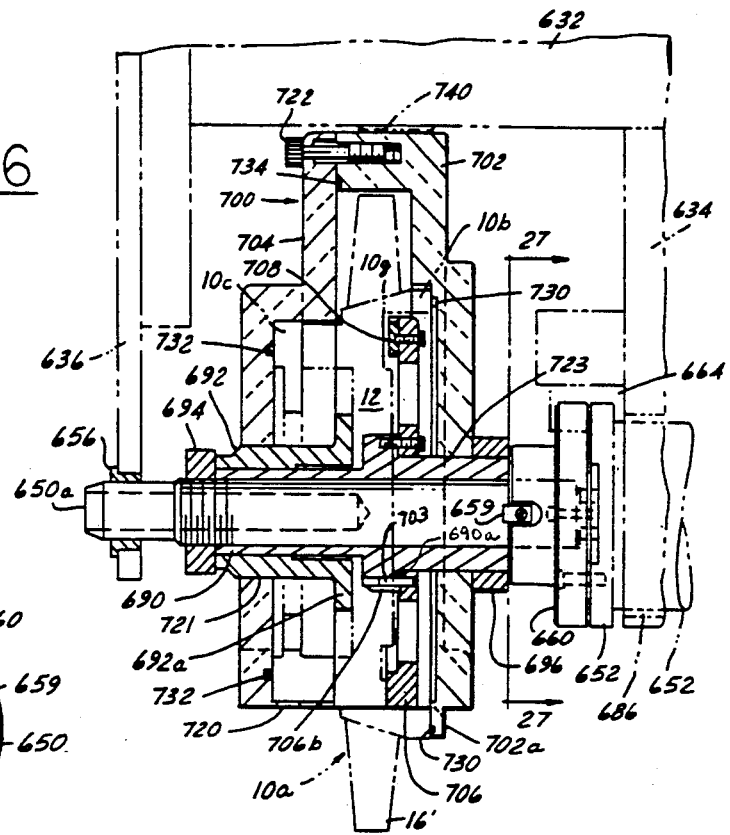
FIG. 26 is a sectional view taken along line 26 of FIG. 24.
Figure 27:
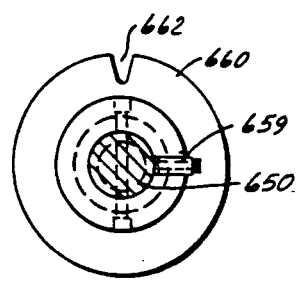
FIG. 27 is a sectional view taken along line 27 of FIG. 26 where only one slot 662 is shown for convenience.
Figure 28:
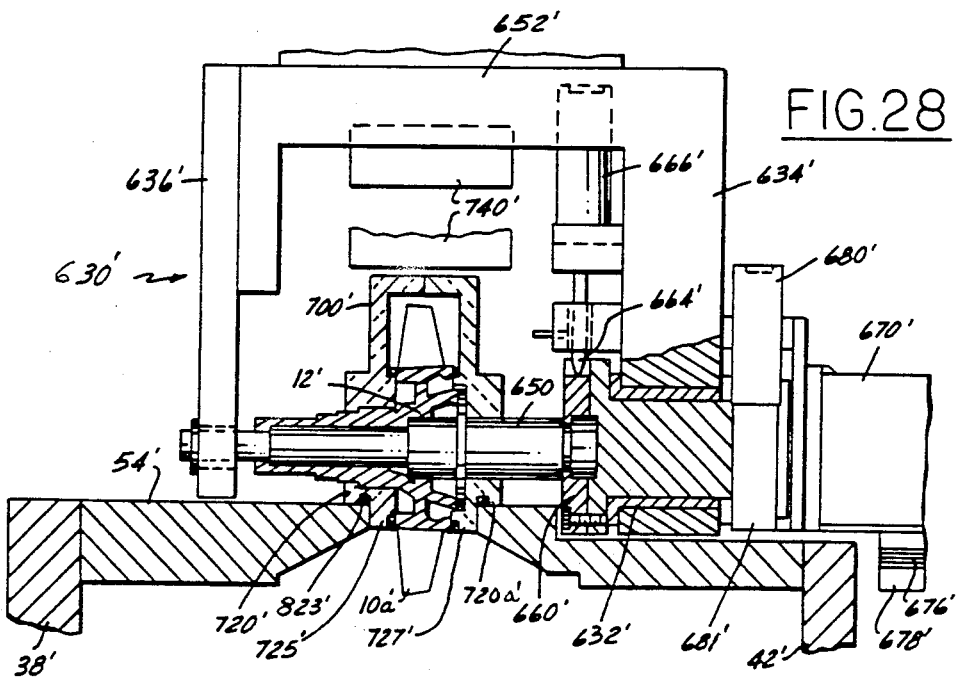
FIG. 28 is a sectional view similar to FIG. 26 of another embodiment of the arbor.
Figure 33:
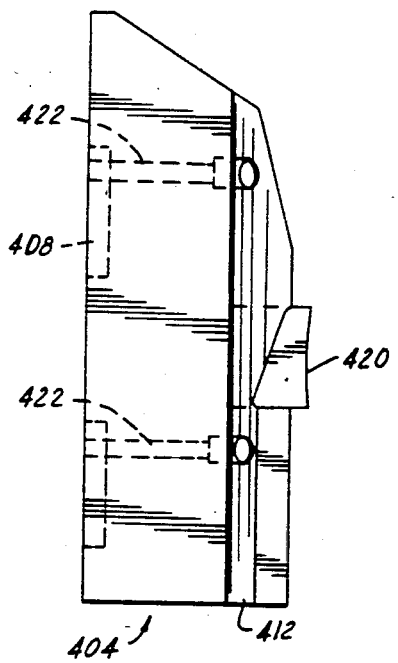
FIG. 33 is a side elevation of the tip seal block.

The yoke assembly 630 carries and supports an electrically conductive rotary arbor 650 and indexer stub shaft 652 between the front and rear vertical yoke members 634,636 as shown best in FIGS. 26 and 28. In particular, the front end 650a of the arbor shaft is received in an electrical insulating bushing 656 in the vertical yoke member 636. The rear end of the arbor is received and releasably retained by key 659 in the copper socket member 660 attached to copper indexer shaft 652 for incremental rotary indexing of the arbor by the indexer shaft. Indexer shaft 652 is in turn attached and keyed by key 671 to a drive shaft 673. The output shaft 653a of a conventional gear reducer is attached and keyed by key 675 to the drive shaft 673 which is made of electrical insulating material to electrically isolate the gear reducer 653 and indexing motor 670 from the indexer shaft.

The socket member 660 includes a plurality of radial slots 662 into which a locking plunger 664 of a cylinder 666 is received to releasably lock the angular position of the arbor. In lieu of slots 662 and plunger 664, the angular position of the arbor can be set by indexing the arbor with a numerically controlled servomotor.

Figure 41:
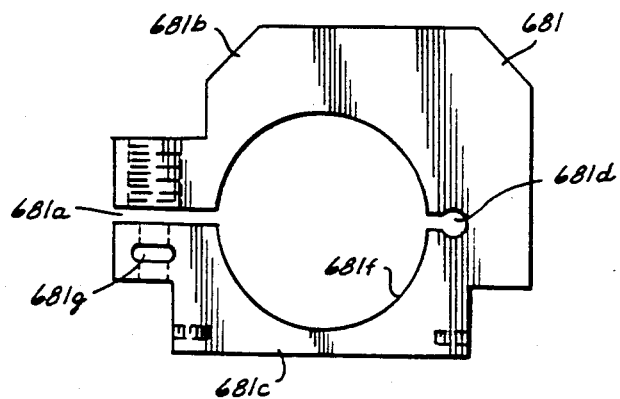
FIG. 41 is an elevation of the clamp itself.

The indexer shaft 652 is driven in angular increments by the output shaft of the gear reducer 653 which is driven by D.C. motor 670, FIGS. 5 and 38-40. Electrical bus bar 676 carries D.C. electrical current for the ECM process from a supply to a frame 678 on which the gear reducer is mounted, FIGS. 38-40. The buss 676 is mounted to copper support frame 678 by brass buss retainer 677 having hub 677a. The D.C. electrical current of proper polarity to make the IBR an anode passes through the frame 678 and through indexer shaft 652 to the arbor 650 on which the IBR is supported. Indexer shaft 652 is electrically insulated from the yoke assembly 630 by bushing 686. To insure good electrical contact between the indexer shaft and buss bar 676, a copper clamp 681 (FIG. 41) is mounted by machine screws 679 on copper support frame 678 and copper side rails 678a. The clamp 681 has slot 681a between upper and lower arms 681b,c and can flex about aperture 681d. A threaded nut 683 is carried in another slot 681g of the clamp. The double-acting cylinder 680 includes threaded housing 680a mounted on upper arm 681b of the clamp. The cylinder 680 has a plunger 682 with threaded end 682a threadably engaged in nut 683. Actuation of air cylinder 680 in one direction causes its plunger 682 to rise and tightly flexibly close clamp 681 around the rear end of copper indexer shaft 652. The clamp is released by reverse action of the plunger in the other direction and also the resilient spreading action of the clamp about aperture 681d. This shaft clamping action also serves as locking function with respect to locking the rotary indexed position of the shaft 652 and arbor during the ECM process. Insulator blocks 685 are positioeed between conductive mounting plates 687 and vertical yoke member 634 to electrically insulate D.C. motor 670.

It is apparent that clamp 681 includes the upper and lower arms 681b,c which define bore 681f therebetween in which the rear end of indexer shaft 652 is received for clamping.

The indexer shaft 652 is rotatably mounted in busing 686 in the rear vertical yoke member 634.

As shown best in FIG. 26, the arbor 650 carries on it a locator sleeve 690, a clamp sleeve or ring 692, locking nut 694 and spacer 696. A sealing shroud 700 includes a rear portion 702 carried directly on the locator sleeve of the arbor and a front portion 704 carried on the clamp sleeve 692. Fastened to the radial shoulder 690a of the locator sleeve 690 is an annular lock ring 706 having locating keys 708 (only one shown). A plurality of circumferential machine screws (only one shown) and dowel pins 703 extend between locator sleeve 690 and lock ring (706) for proper alignment therebetween.

As is apparent, the hub 12 of the IBR 10 rests on the cylindrical locator hub 706b of the locator sleeve 690 with keys 708 locating on radially disposed and circumferentially disposed slot 10g of the IBR. The radial annular flange 692a of the clamp sleeve is brought up tight against the IBR hub 12 by rotation of locking nut 694 to further lock the position of the IBR on the arbor. Since the arbor, locator sleeve, clamp sleeve are all electrically conductive, the IBR receives the ECM D.C. current through these members during the ECM process.

Figure 24:
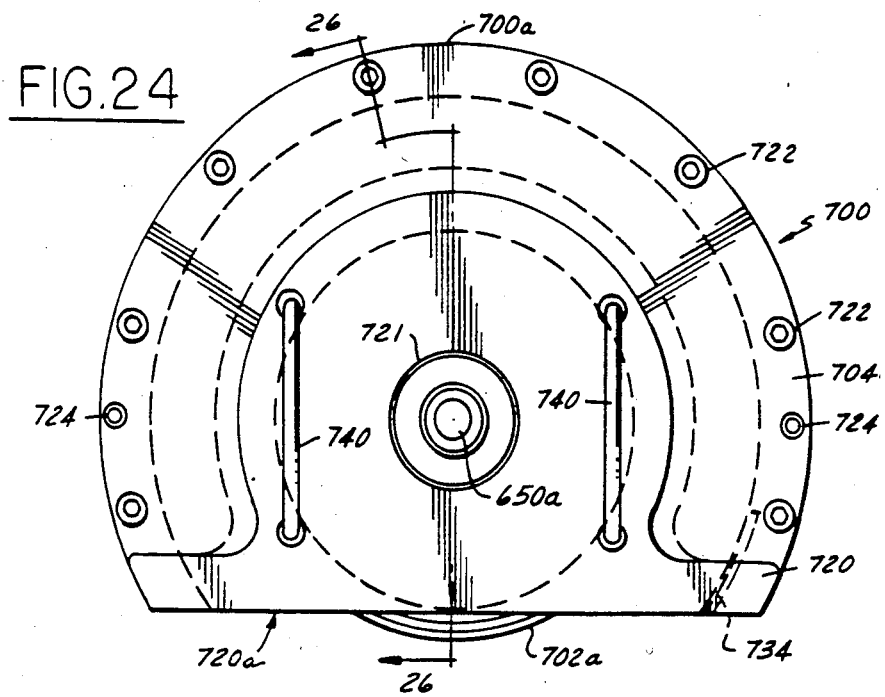
FIG. 24 is a front elevation of the sealing shroud.

As also shown in FIG. 26, the sealing shroud 700 made in part of the G10 material encloses the IBR except for the portion 10a of the IBR extending through the rectangular bottom opening 710 of the shroud flange portion 720. The shroud rear portion 702 and front portion 704 are releasably fastened together by a plurality of threaded captive screws 722 spaced circumferentially therearound, FIG. 24. Two guide pins 724 in a respective bushing 726 in front portion are disposed between the shroud rear and front portions to effect proper alignment thereof. The rear portion and front portion of the shroud include generally circular seals 730,732 to sealingly engage annular rims 10b, 10c on the IBR. A seal 734 of circular arc shape is provided between the front and rear portions of the shroud as shown.

The front face of the front portion of the shroud 700 has an opening 721 through which the arbor and clamp sleeve pass and also carries a pair of handles 740 by which the front portion can be removed after the bolts 722 are removed to allow the IBR to be removed from the arbor after machining and new IBR inserted for machining. Of course, locking nut 694, clamp sleeve 692 and front vertical yoke member 636 are removed to permit the shroud front portion and IBR to be slipped off the arbor. Front vertical yoke member 636 is removed by removing machine screws 637.

The rear shroud portion 702 includes an opening 723 through which arbor and locator sleeve pass.

Figure 25:
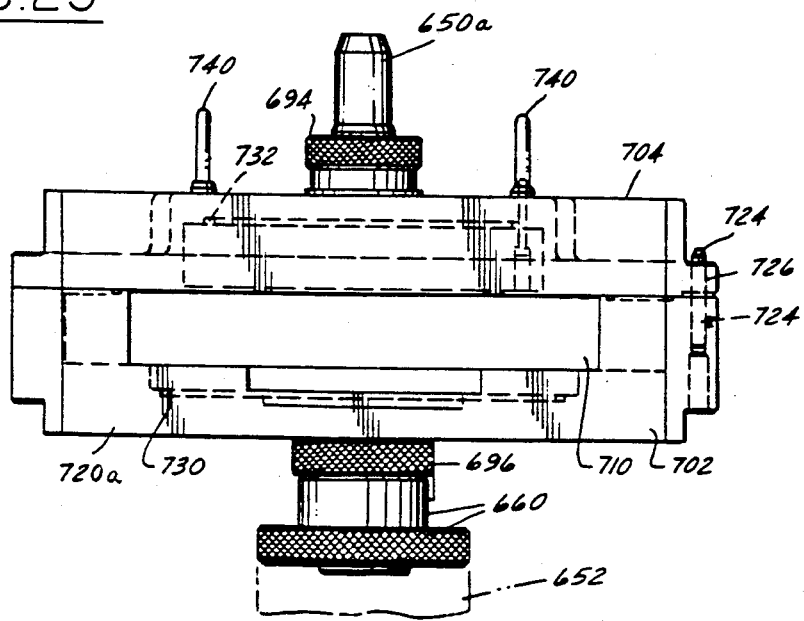
FIG. 25 is a bottom elevation of the sealing shroud.

The bottom of the sealing shroud 700 includes a generally rectangular flange portion 720 (FIGS. 24–25) which is adapted to be received in the generally rectangular recess 520 of top cover 54 with close tolerance once the yoke assembly 630 has been pivoted about pivot pin 638 to bring the IBR lateral center plane W into coincidence with the angle of the center plane H of the recess 520 at the workpart machining position M. The recess center plane angle H is selected for a particular IBR and blade design to facilitate access of the cathodes 304,306 to the opposite sides 18,20 of the airfoil blade 16' to be machined. Since the IBR center plane W has been made substantially coincident with the recess center plane H, the Z-axis slide 602 is lowered to insert the rectangular shroud flange portion 720 in close tolerance fit in recess 520 with the flange portion and recess thus acting as first and second locator means for precisely positioning the airfoil blade to be machined 16' at the workpart machining position M in the electrolyte chamber between the cathodes 304,306 at the cathode machining position. When the flange portion is received and registered in recess 520, the hub portion 10a projecting through flange opening 710 is received in recess 524 and the blade 16' to be machine and blades immediately adjacent thereto and projecting through flange opening 710 are received in recess 522 with ample clearance. The seal member 530 in the bottom of recess 520 seals against the bottom 720a of flange portion 720 of the sealing shroud 700 to prevent high pressure electrolyte leakage.

Alternately as shown in FIG. 28 where like features bear like reference numerals primed, a seal member 723' may be carried on the bottom 720a of the flange portion 720' of sealing shroud 700' to sealingly engage the top of the cover 54'. A depending flange portion 725' functions as a locator means in conjunction with opening 727' in the cover 54' to precisely position the blade to be machined.

Although the arbor 650 and IBR 10 are indexable in rotary increments within the sealing shroud 700, the shroud itself is fixed in position during such indexing of the arbor by retaining plate 740 on horizontal yoke member 632. In particular, retaining plate 740 is closely spaced to a flat 700a on the top of the sealing shroud 700 and prevents substantial rotation of the shroud although minor rocking thereof does occur.

In the ECM process or method for machining the individual oversize airfoil blades to final dimension, the IBR is fixtured on arbor 650 with the yoke assembly 630 retracted upwardly by movement of Z-axis slide 602. In the fixtured position, the arbor 650 extends through the central mounting hole 14 of the IBR and through the respective holes in rear portion 702 and front portion 704 of the sealing shroud and is clamped as shown best in FIG. 26. Indexer shaft 652 is indexed by motor 670 to a so-called number 1 position to place an individual airfoil blade 16' in the central depending position with its centerline F in the machine center plane P substantially on the line of intersection of plane P with cathode center planes CC at the workpart machining position M ready for insertion in the electrolyte chamber 36 between cathodes 304,306 as described below. Of course, airfoil blades 16'' and 16''' immediately adjacent blade 16' to be machined depend downwardly as shown in FIG. 42.

The yoke assembly 630 is pivoted about pivot pin 638 with screw 642 and collar 640 loosened to place the lateral center plane W of the IBR at a selected angular relation (angle B) to the machine center plane P (FIG. 3) and to the cathode center planes CC at the machining position M and cathode machining position to facilitate access to the blade 16' by the cathodes 304,306 and to place the locating flange 720 of the sealing shroud 700 at the required angle for registry with locating recess 520 of the top cover 54 of the structure 34. The pivoted angular position of the yoke assembly 630 is releasably locked by tightening screws 642 on collar 640.

When the Z-axis slide 602 is at the fully retracted home position for fixturing the IBR thereon, the right X-axis ram and left X-axis ram 150 are fully retracted to a home position in the electrolyte chamber wherein both cathodes 304,306 are retracted along the respective left or right X-axes about two inches from machine center plane P at the workpart machining position M to provide ample clearance. Similarly, the right Y-axis slide and left Y-axis slides 96,94 are retracted to the home position wherein both cathodes 304,306 are retracted to the rear in the respective left or right Y-axes to position the cathode center plane CC about one inch from its position at the cathode machining position adjacent the workpart machining position M with center planes CC parallel with its position at the cathode machining position to provide ample clearance. The electrolyte valve to the electrolyte inlet 440 is closed and D.C. power supply is turned off.

Figure 42:
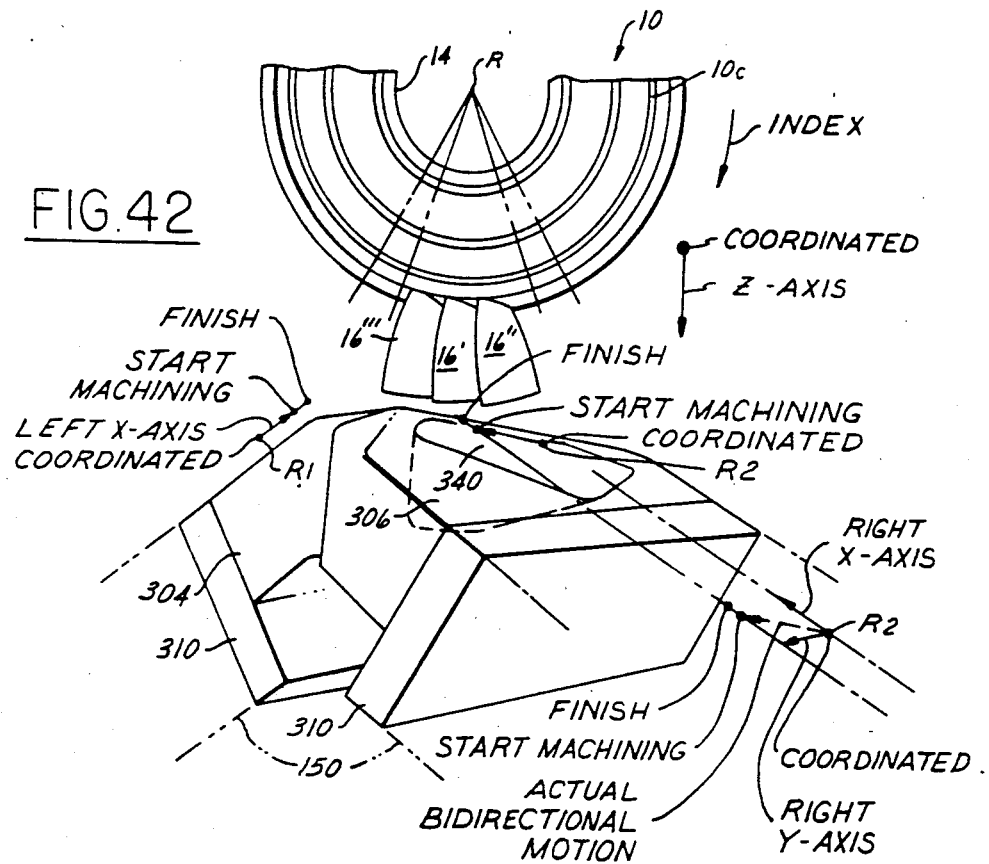
FIG. 42 is a perspective view of the cathodes and IBR illustrating typical movements of reference centerlines R1 and R2 of the cathodes as well as movement of the IBR involved in the ECM method with the bi-directional movement of centerline R2 broken down into right X and Y axes components in the side projection thereof.
Figure 43:
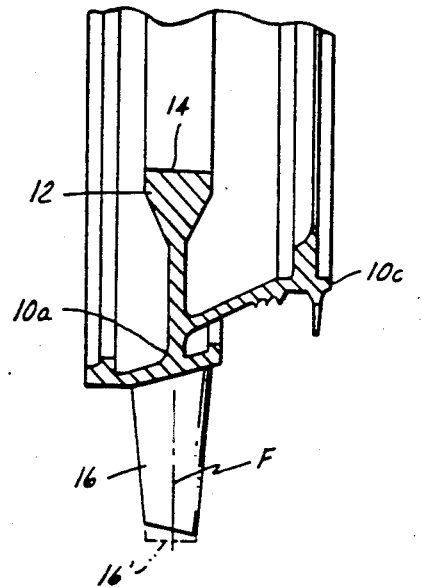
FIG. 43 is a partial sectional view of the IBR.
Figure 44:
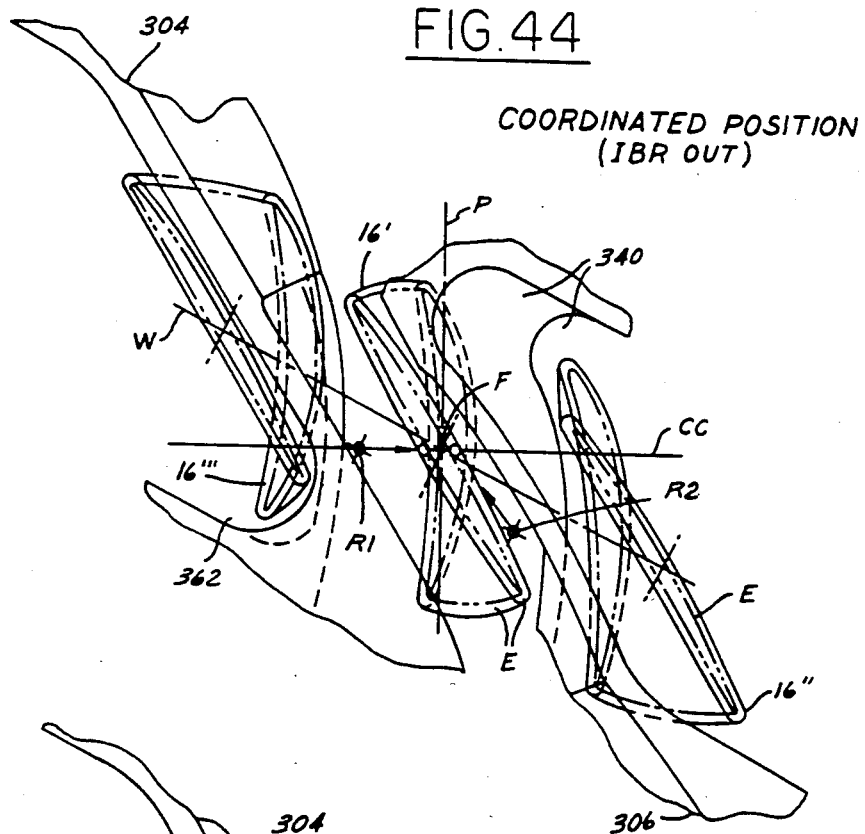
FIG. 44 is an elevational view looking from the tip of the blade 16' to root with cathode positions superimposed to show relative spatial relationships therebetween at a coordinated position.

The machine start cycle consists of moving the cathodes 304,306 from the home position to the coordinated position shown in FIGS. 42 and 44. Movement of right cathode 306 from the home position to the coordinated position involves simultaneous movement along both the right X-axis and right Y-axis by respective right hand motors 142 and 260, and movement of left cathode 304 from the home position to the coordinated position involves simultaneous movement alng the left X-axis and left Y-axis by respective left hand motors 142 and 260. Although the left X-axis and Y-axis movement of cathode 304 are simultaneous, they can be carried out in successive steps instead but this is not preferred. The same applies to the movement of cathode 306 simultaneously along the right X-axis and Y-axis.

It can be seen that at the coordinated position for the particular IBR shown that the cathode 304 (concave cathode) is positioned with a reference centerline R1 on the cathode center plane CC and that cathode 306 is positioned with a reference centerline R2 displaced or offset from the cathode center plane CC. Reference centerlines R1 and R2 are reference lines that correspond to the position of the airfoil blade vertical centerline F relative to the working faces of cathodes 304,306 at the finish machine position shown in FIG. 46 and are the reference lines employed to program the necessary cathode movements to obtain access to and machine the desired final dimension on the airfoil blade 16'.

Of course, offsetting of cathode 306 in the Y-direction is effected by Y-axis slide 96 an its drive motor 142. For the particular IBR shown, no offsetting of cathode 304 along the left Y-axis is required, although it is of course possible, to gain access to the concave side of blade 16'. If the airfoil blades 16 of the IBR are inclined in the opposite direction from that shown, then cathode 304 would be offset and cathode 306 would not be; i.e. the relationship of the cathodes 304,306 to cathode center planes CC would be reversed.

Figure 45:
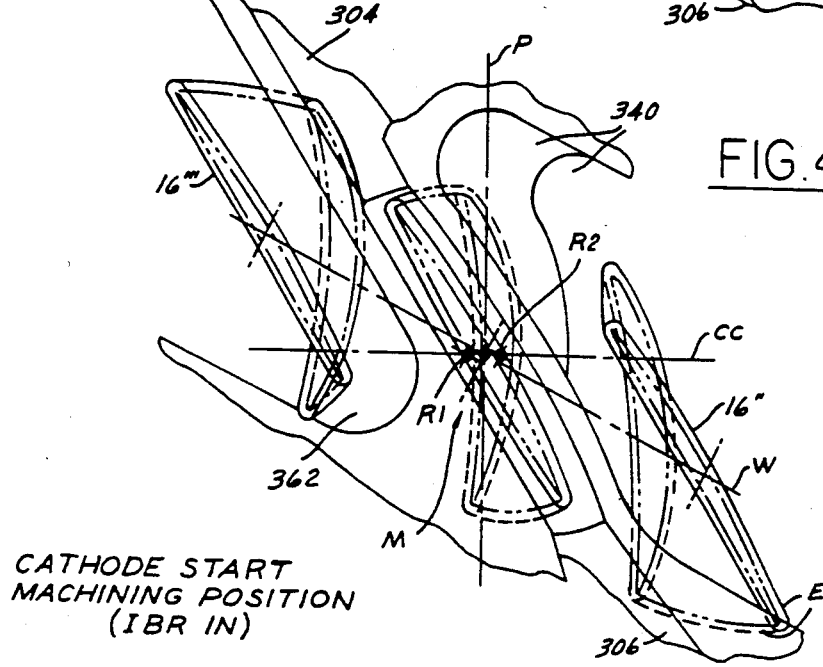
FIG. 45 is a view similar to FIG. 44 but with the cathodes and IBR at a cathode machining position.

From the coordinated position shown in FIG. 44, the cathodes are brought to the cathode machining position shown in FIG. 45 aligned on opposite sides of the blade 16' at the workpart machining position M while the Z-axis slide 602 concurrently inserts the blade 16' to be machined at the machining position M in the electrolyte chamber 36 with the shroud 700 and locating recess 520 cooperating to precisely position the blade 16' with its centerline F in the machine center plane P at the workpart machining position M and substantially coincident with line of intersection of the plane P and centerline F. The shroud and top plate 54 also effect sealing therebetween as explained above when the blade 16' and of course adjacent blades 16",16'" are positioned in the electrolyte chamber.

Movement of the cathodes 304,306 to the cathode machining position is indicated by arrows in FIGS. 42 and 44. The open circles in FIG. 44 designate the ultimate positions of reference centerlines R1 and R2 at the cathode machining position shown in FIG. 45. The cathode machining position of R1 and R2 relative to centerline F of the airfoil blade 16' is shown in FIG. 45.

It is clear that the cathode 306 has been moved in both right X-axis and Y-axis directions to arrive at the right cathode machining position shown. Typically, movement of cathode 306 in both these directions occurs simultaneously by simultaneous actuation of right drive motor 142 for right ram 150 and right drive motor 260 for slide 96 carrying right cathode support 102. It is also clear that cathode 304 has moved only in the left X-direction with no left Y-direction movement. Movement of the cathode 304 thusly occurs concurrently with the bi-directional movement of cathode 306 as well as concurrently with downward vertical movement of Z-axis slide 602 to position blade 16' in the electrolyte chamber 36. Although rectilinear bi-directional movement of cathode 306 is shown, it will be apparent that depending on IBR design, the bi-directional movement of cathode 306 may be a curvilinear path to access the blade to be machined and obtained by suitable actuation of the drive motors for the cathode ram and slide.

During this simultaneous movement of the blade 16' on Z-axis slide 602 and cathodes 304,306 to the cathode machining position, the blades 16",16'" immediately adjacent blade 16' are received in pockets 340,362 of the cathodes 306,304, respectively, as illustrated in FIG. 45 with the adjacent blades not contacting the cathodes 306,304 in whose pockets they are received.

During movement of the cathodes 304,306 from the coordinated position to the cathode machining position, the sealing pistons 470 are each actuated by their respective fluid cylinders 480 to move in coordination with cathodes 304,306 in the general Y-direction toward the front of the chamber 36 to follow the cathode movement to the cathode machining position. Alternatively, the sealing pistons can be actuated to be sealingly positioned relative to the cathodes after they are positioned at the cathode machining position of FIG. 45.

Once the cathodes 304,306 and blade 16' (Z-axis slide 602) are positioned at the cathode machining position, D.C. power is supplied to anode buss 676 and hence to the IBR and blade 16' and cathode busses 121 (right and left) and hence to cathodes 304,306. Copper clamp 681 is actuated by cylinder 680 to tightly grip indexer shaft 652 to insure good electrical conductivity therebetween and also further lock the position of the indexer shaft. And, upper and lower clamp cylinders 230 associated with the left and right Y-axis slides 94,96 are actuated to clamp the slides 94,96 as described hereinabove in the Y-axis position at the cathode machining position. The electrolyte valve is then opened to introduce flowing high pressure electrolyte; e.g. an aqueous saline solution, through electrolyte inlet 440.

Figure 46:
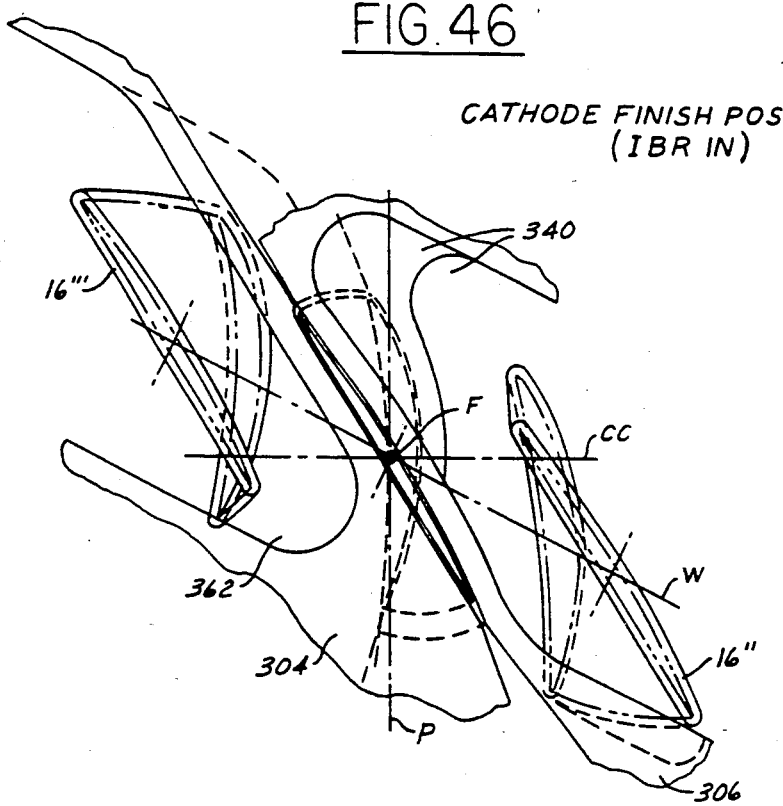
FIG. 46 is a view similar to FIGS. 44 and 45 but with the cathodes at a finish position.
Figure 47:
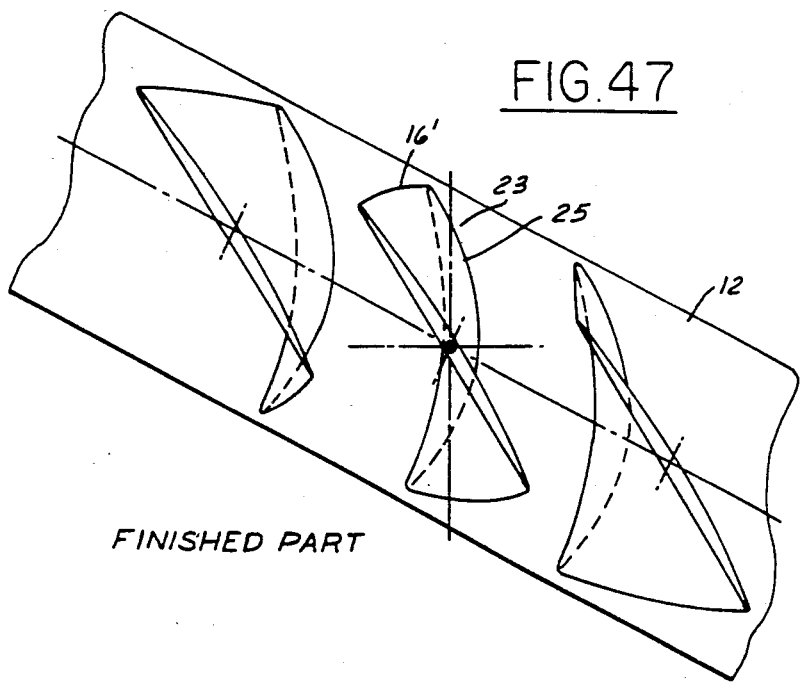
FIG. 47 is a tip to root elevational view showing a finished blade.

From the cathode machining position shown in FIG. 45, the cathodes 304,306 are advanced along their respective left and right X-axes toward one another and toward the respective sides 18,20 of the blade 16', with adjacent blades 16", 16'" remaining in the cathode pockets out of contact to remove the oversize or envelope E on the blade 16' (sides 18,20) as well as machine the leading and trailing edges, fillet radii and platforms to final dimension. The cathode finish position of the cathodes is shown in FIG. 46 where it is evident that the reference centerlines R1 and R2 are coincident with the finish machined blade centerline F at the workpart machining position M. Advancement of cathodes 304,306 along their X-axes is at a slower feed rate than advancement to the cathode machining position from the coordinated position.

During the machining process when the cathodes move from the cathode machining position of FIG. 45 to the cathode finish position of FIG. 46, high pressure electrolyte continuously discharges from inlet 440 and is guided by the sealing pistons 470 which provide a flow path therebetween toward the blade 16' and substantially prevent electrolyte from bypassing the cathodes on the rear side thereof as a result of the sealing relation of the sealing pistons and the rear sides of the cathodes and the electrolyte pressure balance on the sealing pistons allowing the sealing relation to be maintained as each cathode moves or slides relative to the associated sealing piston. Also, the tip of the blade 16' is positioned against tip seal 420 to further minimize electrolyte bypassing action.

During advancement of the cathodes from the cathode machining position to the cathode finish position, the electrical insulating layers 340a, 362a in each pocket from flowing through stagnant electrolyte in the pockets etween the adjacent blades 16", 16''' in the pockets and the associated cathodes. These adjacent blades may also be masked with electrical insulating material to prevent such unwanted stray currents.

Once the cathode finish position of FIG. 46 is reached by the cathodes 304,306, the D.C. power supply is turned off, copper clamp 681 is released and the rams 150 (right and left) slow feed back along the left and right X-axes to withdraw the cathodes about 0.005 inch away from the finish machined blade 16'with blades 16", 16''' still in the cathode pockets out of contact with the cathodes. The electrolyte valve is closed and the clamp cylinders 230 are deenergized to release the Y-axis slides 94,96. The cathodes and associated rams 150 as well as Z-axis slide 602 go back to the coordinated position at a feed rate intermediate the high and slow feed rates mentioned with adjacent blade 16", 16''' still out of contact. Sealing pistons 470 are moved in a manner to allow the cathodes and cams 150 to return to the coordinated position.

At the coordinated position, the indexer motor 613 indexes indexer shaft 652 to the next position (next slot 662) with lock plunger 664 withdrawn by cylinder 666 so as to position another airfoil blade 16 in position for insertion in the electrolyte chamber 36 for machining. Typically, the indexer shaft 652 will index to position every other blade successively at the position for insertion in the chamber.

The cylinder 666 and plunger 664 of course are actuated to lock the indexer shaft in its new position.

The sequence of actions described hereinabove from the cathode machining position to the cathode finish position is then repeated to machine the newly positioned blade and is repeated until all the individual blades 16 have been machined to final dimension.

When the blades of the IBR are all machined, the cathodes 304,306 and Z-axis slide 602 are returned to the home position for removal of the machined IBR and fixturing of another IBR on the arbor for machining.

Although operation of the machine has been described with cathode 306 going through bi-directional movements (right X-axis and right Y-axis) and cathode 304 going through movement only along the left X-axis with no left Y-axis movement, both cathodes 304,306 can be moved simultaneously independently and bi-directionally if required by a particular IBR design as will be fully apparent to those skilled in the art.

A preferred electrochemical machine in which the electrolyte chamber of this invention can be used is described in copending application Ser. No. 029,019 entitled "ECM Machine With Mechanisms For Venting And Clamping A Workpart Shroud" filed in the name of Edmund R. Hinman as inventor, the teachings of which are incorporated herein by reference.

While certain preferred embodiments of the invention have been described in detail hereinabove, those familiar with this art will recognize that various modifications and changes can be made therein for practicing the invention as defined by the following claims.

I claim:

1. An electrolyte chamber for electrochemically machining a workpart positioned therein as an anode comprising cathode means movably disposed in the chamber for movement in a direction generally toward the workpart, electrolyte inlet means in the chamber for introducing pressurized electrolyte into the chamber, sealing means moveable in opposite directions in the chamber toward or away from the cathode means to close off or open a space between the cathode means and electrolyte chamber forming means, means for moving the sealing means in the chamber in said opposite directions and means for substantially balancing electrolyte pressure on the sealing means in the opposite directions.

2. The electrolyte chamber of claim 1 wherein the sealing means includes a first side facing the cathode means and a second side of approximate equal area operatively connected to the means for moving the sealing means and wherein said means for balancing electrolyte pressure comprises means for fluidly interconnecting the first side and second side such that electrolyte pressure on one side also will be substantially present on the other side.

3. The electrolyte chamber of claim 2 wherein the means for interconnecting the first side and second side to electrolyte pressure comprises conduit means extending through the sealing means between the fist side and second side.

4. The electrolyte chamber of claim 3 wherein the conduit means comprises one or more passages extending between the first side and second side.

5. The electrolyte chamber of claim 1 wherein the means for moving the sealing means comprises an actuator means outside the chamber and an actuator member actuated by said actuator means and extending through a wall forming said chamber and connected to said sealing means, and electrolyte sealing means between said actuator member and said wall.

6. The electrolyte chamber of claim 5 wherein the actuator means comprises a fluid cylinder and the actuator member comprises a piston operable by the fluid cylinder.

7. The electrolyte chamber of claim 1 wherein the cathode means is also movable in another direction in the chamber transverse to said direction and the sealing means is movable in said another direction in the chamber to close off the space.

8. An electrolyte chamber for electrochemically machining a workpart positioned therein as an anode comprising wall means forming said chamber, first and second cathodes disposed in the chamber for movement in respective directions toward one another with the workpart therebetween and respective transverse directions thereto in a clearance space between each cathode and the wall means, electrolyte inlet means in the chamber for introducing pressurized electrolyte between the cathodes and workpart transverse to said respective directions of cathode movement toward one another, first and second sealing means in the chamber on opposite sides of the electrolyte inlet means moveable in opposite directions in the clearance space transverse to cathode movement in said respective directions to substantially close or open the clearance space between the wall means and respective first or second cathode for substantially preventing electrolyte flow bypassing around the cathodes as they move in said respective directions toward one another when the clearance space is closed off, means for moving the first and second sealing means in the opposite directions in the clearance space transverse to cathode movement in said respective directions, and means for substantially balancing electrolyte pressure on each of the first and second sealing means in the opposite directions.

9. The electrolyte chamber of chamber claim 8 wherein the sealing means includes a first side facing the cathode means and a second side of approximate equal area operatively connected to the means for moving the sealing means and wherein said means for balancing electrolyte pressure comprises means for fluidly interconnecting the first side and second side such that electrolyte pressure on one side also will be substantially present on the other side.

10. The electrolyte chamber of claim 8 wherein the means for interconnecting the first side and second side to electrolyte pressure comprises conduit means extending through the sealing means between the first side and second side.

11. The electrolyte chamber of claim 8 wherein each cathode is slidably received in a bore in the wall means and is movable transversely in one direction toward the cathode means and transversely in an opposite direction toward the bore.

12. The electrolyte chamber of claim 11 wherein each sealing means includes a first side facing the respective cathode and a second side facing the respective bore and wherein said means for substantially balancing electrolyte pressure includes a conduit means between the first side and second side such that pressurized electrolyte on the first side is also present on the second side in said respective bore.

* * * * *

UNITED STATES PATENT AND TRADEMARK OFFICE
CERTIFICATE OF CORRECTION

PATENT NO. : 4,797,189

DATED : January 10, 1989

INVENTOR(S) : Edmund R. Hinman et al.

It is certified that error appears in the above-identified patent and that said Letters Patent is hereby corrected as shown below:

Column 1, line 27, before "al" insert --et--.

Column 1, line 32, delete "Tne" and insert --The--.

Column 1, line 40, delete "mcchining" and insert --machining--.

Column 1, line 48, after "time" insert --.--.

Column 3, line 56, delete "Fig. 14" and insert --Fig. 15--.

Column 4, line 1, before "of" insert --23--.

Column 6, line 39, delete "rssult" and insert --result--.

Column 8, line 34, delete "20" and insert --220--.

Column 8, line 35, delete "24" and insert --224--.

Column 10, line 3, delete "bottoms" and insert --bottom--.

UNITED STATES PATENT AND TRADEMARK OFFICE
CERTIFICATE OF CORRECTION

Page 2 of 4

PATENT NO. : 4,797,189

DATED : January 10, 1989

INVENTOR(S) : Edmund R. Hinman et al.

It is certified that error appears in the above-identified patent and that said Letters Patent is hereby corrected as shown below:

Column 10, line 22, delete "athodes" and insert --cathodes--.

Column 10, line 43, delete "a" and insert --an--.

Column 11, line 34, delete "seals" and insert --seal--.

Column 12, line 53, delete "view" and insert --viewed--.

Column 13, line 28, delete "or" after "Z-axis".

Column 14, line 51, delete "positioeed" and insert --positioned--.

Column 14, line 58, delete "busing" and insert --bushing--.

Column 15, line 2, delete "(706)" and insert --706--.

Column 15, line 66, delete "machine" and insert --machined--.

Column 16, line 7, delete "720a" and insert --720a'--.

UNITED STATES PATENT AND TRADEMARK OFFICE
CERTIFICATE OF CORRECTION

PATENT NO. : 4,797,189

DATED : January 10, 1989

INVENTOR(S) : Edmund R. Hinman et al.

It is certified that error appears in the above-identified patent and that said Letters Patent is hereby corrected as shown below:

Column 17, line 11, delete "alng" and insert --along--.

Column 18, lines 51 and 52, delete blank spaces between "adjacent" and "blades".

Column 19, line 13, after "pocket" insert --340,362 of the cathodes prevent stray electrical currents--.

Column 19, line 15, delete "etween" and insert --between--.

Column 20, line 33, delete "fist" and insert --first--.

UNITED STATES PATENT AND TRADEMARK OFFICE
CERTIFICATE OF CORRECTION

PATENT NO. : 4,797,189
DATED : January 10, 1989
INVENTOR(S) : Edmund R. Hinman, et. al.

It is certified that error appears in the above-indentified patent and that said Letters Patent is hereby corrected as shown below:

Column 21, line 14, delete "chamber" (second occurrence).

Signed and Sealed this

Nineteenth Day of October, 1993

Attest:

BRUCE LEHMAN

*Attesting Officer*    Commissioner of Patents and Trademarks